United States Patent
Gong et al.

(10) Patent No.: US 12,067,974 B2
(45) Date of Patent: Aug. 20, 2024

(54) SPEECH RECOGNITION METHOD, WEARABLE DEVICE, AND ELECTRONIC DEVICE

(71) Applicant: HUAWEI TECHNOLOGIES CO., LTD., Shenzhen (CN)

(72) Inventors: Shuqiang Gong, Dongguan (CN); Jianyong Gong, Shanghai (CN); Cunshou Qiu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 660 days.

(21) Appl. No.: 17/270,271

(22) PCT Filed: Oct. 12, 2018

(86) PCT No.: PCT/CN2018/109990
§ 371 (c)(1),
(2) Date: Feb. 22, 2021

(87) PCT Pub. No.: WO2020/037795
PCT Pub. Date: Feb. 27, 2020

(65) Prior Publication Data
US 2021/0319782 A1 Oct. 14, 2021

(30) Foreign Application Priority Data
Aug. 23, 2018 (CN) .......................... 201810966801.1

(51) Int. Cl.
*G10L 15/08* (2006.01)
*G06F 21/32* (2013.01)
(Continued)

(52) U.S. Cl.
CPC .............. *G10L 15/08* (2013.01); *G06F 21/32* (2013.01); *G06V 40/1365* (2022.01);
(Continued)

(58) Field of Classification Search
CPC .......... G06F 21/32; G06F 21/31; G06F 1/163; G10L 15/30; G10L 17/06
See application file for complete search history.

(56) References Cited

U.S. PATENT DOCUMENTS 10,345,902 B1 * 7/2019 Yildiz ................ G02B 27/0093
10,701,067 B1 * 6/2020 Ziraknejad ............ H04W 12/63
(Continued)

FOREIGN PATENT DOCUMENTS

| CN | 203279187 U | 11/2013 |
|---|---|---|
| CN | 105023575 A | 11/2015 |

(Continued)

OTHER PUBLICATIONS

International Search Report issued in corresponding International Application No. PCT/CN2018/109990, dated May 14. 2019, pp. 1-11.

(Continued)

*Primary Examiner* — Mark Villena
(74) *Attorney, Agent, or Firm* — HAUPTMAN HAM, LLP

(57) ABSTRACT

A wearable device collects a fingerprint pattern input by a user and speech input by the user. The wearable device sends the fingerprint pattern to an electronic device, to enable the electronic device to perform authentication on the fingerprint pattern input by a user. The wearable device sends the speech to the electronic device, and, upon a determination that the authentication succeeds, the electronic device is enabled to execute a function corresponding to the speech.

12 Claims, 19 Drawing Sheets

(51) Int. Cl.
*G06V 40/12* (2022.01)
*H04R 5/033* (2006.01)

(52) U.S. Cl.
CPC ..... *H04R 5/033* (2013.01); *G06F 2221/2149* (2013.01); *G10L 2015/088* (2013.01)

(56) References Cited

U.S. PATENT DOCUMENTS

| | | | |
|---|---|---|---|
| 2014/0337634 A1 | 11/2014 | Starner et al. | |
| 2015/0186636 A1* | 7/2015 | Tharappel | G06F 21/32 726/8 |
| 2017/0257698 A1* | 9/2017 | Boesen | G10L 17/00 |
| 2017/0308689 A1* | 10/2017 | Boesen | G06F 1/163 |
| 2018/0060555 A1* | 3/2018 | Boesen | H04W 4/38 |
| 2018/0240463 A1* | 8/2018 | Perotti | G10L 17/22 |

FOREIGN PATENT DOCUMENTS

| | | |
|---|---|---|
| CN | 105096951 A | 11/2015 |
| CN | 105389701 A | 3/2016 |
| CN | 105701386 A | 6/2016 |
| CN | 105960196 A | 9/2016 |
| CN | 106328132 A | 1/2017 |
| CN | 206472269 U | 9/2017 |
| CN | 107249152 A | 10/2017 |
| CN | 107705127 A | 2/2018 |
| CN | 107798232 A | 3/2018 |
| CN | 108351698 A | 7/2018 |

OTHER PUBLICATIONS

Extended European Search Report issued in corresponding European Application No. 18930869.5, dated Aug. 13, 2021, pp. 1-8, European Patent Office, Munich, Germany.

* cited by examiner

SPEECH RECOGNITION METHOD, WEARABLE DEVICE, AND ELECTRONIC DEVICE

CROSS-REFERENCE TO RELATED APPLICATIONS

This application is a National Stage of International Application No. PCT/CN2018/109990, filed on Oct. 12, 2018, which claims priority to Chinese Patent Application No. 201810966801.1, filed on Aug. 23, 2018. All of the aforementioned applications are hereby incorporated by reference in their entireties.

TECHNICAL FIELD

This application relates to the field of communications technologies, and in particular, to a speech recognition method, a wearable device, and an electronic device.

BACKGROUND

Currently, terminals such as a mobile phone and a tablet computer support access to an accessory such as a headset. The mobile phone and a Bluetooth headset are used as an example. After a Bluetooth connection is established between the mobile phone and the Bluetooth headset, a user may use the Bluetooth headset to play a song on the mobile phone, make a call with a contact, and the like.

An application (APP), such as a voice assistant, that can implement a speech recognition function is installed on many mobile phones. The speech recognition function is a function of converting a speech signal into corresponding text or a corresponding command by an electronic device through a recognition and understanding process. When the mobile phone is in a state, such as a screen-locked state, in which authentication needs to be performed on a user identity, the mobile phone needs to first perform authentication on the user identity in a manner such as password verification, fingerprint recognition, or face recognition. After determining that the user is an authorized user, the mobile phone may enable the speech recognition function to perform speech recognition on a speech signal collected by the Bluetooth headset. Consequently, the user needs to frequently operate the mobile phone to perform identity authentication before using the speech recognition function. However, in a scenario in which the user wears a Bluetooth headset and is inconvenient to operate the mobile phone, for example, when the user is far away from the mobile phone, the mobile phone cannot effectively provide the speech recognition function for the user.

SUMMARY

A technical solution of this application provides a speech recognition method, a wearable device, and an electronic device, to avoid inconvenience caused because authentication needs to be performed on a user identity on a terminal when the terminal implements a speech recognition function.

According to a first aspect, a technical solution of this application provides a speech recognition method, where the method includes:

a Bluetooth headset collects a fingerprint pattern input by a user;

the Bluetooth headset collects speech input by the user; and the Bluetooth headset or a mobile phone performs authentication on the fingerprint pattern input by the user, and after the authentication succeeds, the mobile phone executes a function corresponding to the speech; where the Bluetooth headset and the mobile phone may be wirelessly connected by using Bluetooth.

It may be learned that the Bluetooth headset may collect the fingerprint pattern input by the user, and the fingerprint pattern may be used to subsequently perform authentication on a user identity. In this way, the mobile phone can subsequently implement a speech recognition function corresponding to a speech signal while the user does not need to interact with the mobile phone.

In a possible technical solution, that the mobile phone executes a function corresponding to the speech includes:

the Bluetooth headset recognizes a speech command in the speech, the Bluetooth headset sends the speech command to the mobile phone, and the mobile phone executes a function corresponding to the speech command; or the mobile phone may recognize a speech command in the speech, and the mobile phone executes a function corresponding to the speech command; or the Bluetooth headset sends the speech to a cloud server, the cloud server recognizes a speech command in the speech, the cloud server sends the speech command to the Bluetooth headset, the Bluetooth headset sends the speech command to the mobile phone, and the mobile phone executes a function corresponding to the speech command.

It may be understood that the cloud server may alternatively send the speech command to the mobile phone, and the mobile phone executes the function corresponding to the speech command.

In a possible technical solution, the Bluetooth headset may recognize the speech command in the speech, the Bluetooth headset sends the speech to the mobile phone, and the mobile phone may also recognize the speech command in the speech. In this way, the Bluetooth headset may also send the speech command to the mobile phone, the mobile phone may perform comparison to determine whether the speech command recognized by the mobile phone is the same as the speech command recognized by the Bluetooth headset, and if the speech commands are the same, the mobile phone may execute the function corresponding to the speech command, or if the speech commands are different, the mobile phone may discard the speech command and not execute the function corresponding to the speech command. In this way, security can be better ensured.

In a possible technical solution, before the Bluetooth headset or the mobile phone performs authentication on the fingerprint pattern input by the user, the mobile phone may be in a screen-locked state. After the authentication succeeds, the mobile phone may be in an unlocked state.

It may be understood that, before the Bluetooth headset or the mobile phone performs authentication on the fingerprint pattern input by the user, the mobile phone may be alternatively in a screen-off and screen-locked state. After the authentication succeeds, the mobile phone may be in a screen-on and unlocked state.

Optionally, before the Bluetooth headset or the mobile phone performs authentication on the fingerprint pattern input by the user, the mobile phone may be in a screen-off state. After the authentication succeeds, the mobile phone may be in a screen-on state.

In a possible technical solution, that the mobile phone executes a function corresponding to the speech may be at least one of the following functions:

the mobile phone executes a call making function corresponding to the speech; or the mobile phone executes an SMS message sending function corresponding to the speech; or the mobile phone executes an application starting function corresponding to the speech, for example, starting a WeChat application; or the mobile phone executes a photographing function corresponding to the speech, for example, starting a photographing application and performing photographing; or the mobile phone executes a payment function corresponding to the speech, for example, starting Alipay and completing payment.

In a possible technical solution, that the Bluetooth headset or the mobile phone performs authentication on the fingerprint pattern input by the user includes:

the Bluetooth headset compares a pre-stored fingerprint with the fingerprint pattern input by the user; or the mobile phone compares a pre-stored fingerprint with the fingerprint pattern input by the user.

The pre-stored fingerprint may be preset by the user. The pre-stored fingerprint may be stored in the Bluetooth headset, or may be stored in the mobile phone. It may be understood that the pre-stored fingerprint may be alternatively stored in both the Bluetooth headset and the mobile phone.

In a possible technical solution, after the user wears the Bluetooth headset, the user may be prompted, through vibration, speech, or light, to input the fingerprint on a fingerprint sensor of the Bluetooth headset. In this way, user experience is better.

In a possible technical solution, if the Bluetooth headset or the mobile phone performs authentication on the fingerprint pattern input by the user, and the authentication fails, the Bluetooth headset or the mobile phone may discard the fingerprint pattern input by the user. In this way, the fingerprint pattern can be prevented from being stolen, and therefore security is ensured.

In a possible technical solution, the fingerprint pattern input by the user may be stored in the Bluetooth headset.

In a possible technical solution, the Bluetooth headset is in a dormant state, and the Bluetooth headset collects a wake-up phrase input by the user, to wake up the Bluetooth headset. The Bluetooth headset may collect another speech input by the user, and send the another speech and the fingerprint pattern that is stored in the Bluetooth headset to the mobile phone.

In this way, the mobile phone may compare the received fingerprint pattern sent by the Bluetooth headset with the pre-stored fingerprint, and may execute a function corresponding to the another speech after authentication succeeds. For example, Alipay is started to complete payment.

It may be understood that the Bluetooth headset may collect the wake-up phrase and the another speech that are input by the user, and send the wake-up phrase, the another speech, and the stored fingerprint pattern to the mobile phone. In this case, the mobile phone may be woken up by using the wake-up phrase, and the mobile phone may compare the received fingerprint pattern sent by the Bluetooth headset with the pre-stored fingerprint, and may execute the function corresponding to the another speech after authentication succeeds. For example, Alipay is started to complete payment.

It may be understood that the wake-up phrase may wake up the Bluetooth headset, may wake up the mobile phone, or may wake up the Bluetooth headset and the mobile phone.

In a possible technical solution, the Bluetooth headset may discard the collected fingerprint pattern input by the user. In this way, when collecting again the fingerprint pattern input by the user, the Bluetooth headset may be woken up, the Bluetooth headset may send, to the mobile phone, the collected fingerprint pattern input by the user, and the mobile phone performs authentication.

In a possible technical solution, after it is detected that the user removes the Bluetooth headset, the Bluetooth headset may discard the fingerprint pattern input by the user.

It may be understood that the Bluetooth headset is used as an example for description above, and another wearable device may also be used, for example, another wearable device such as smart glasses or a smart wristwatch. Certainly, the Bluetooth headset is also a wearable device. The mobile phone is used as an example for description above, and another electronic device such as a tablet computer or a notebook computer may also be used. Certainly, the mobile phone is also an electronic device.

According to a second aspect, a technical solution of this application provides a speech recognition method, including:

an electronic device receives a fingerprint pattern input by a user, where the fingerprint pattern input by the user is collected by a wearable device;

the electronic device receives speech input by the user, where the speech input by the user is collected by the wearable device; and the electronic device performs authentication on the fingerprint pattern input by the user, and after the authentication succeeds, the electronic device executes a function corresponding to the speech.

The electronic device and the wearable device may be wirelessly connected. For example, the electronic device and the wearable device are connected by using Bluetooth or wifi.

It may be learned that the wearable device may collect the fingerprint pattern input by the user, and the fingerprint pattern may be used to subsequently perform authentication on a user identity. In this way, a mobile phone can subsequently implement a speech recognition function corresponding to a speech signal while the user does not need to interact with the mobile phone. This reduces interaction complexity when speech recognition is performed between the wearable device and the electronic device.

In a possible technical solution, after the authentication performed by the electronic device on the fingerprint pattern input by the user succeeds, the electronic device is in an unlocked state.

In a possible technical solution, the method further includes:

before the electronic device receives the fingerprint pattern input by the user, the electronic device is in a screen-locked state.

In a possible technical solution, that the electronic device performs authentication on the fingerprint pattern input by the user includes:

the electronic device compares the fingerprint pattern input by the user with a pre-stored fingerprint.

In a possible technical solution, the method further includes:

in response to triggering by the user, displaying a management interface of the wearable device, to add at least one fingerprint as an authorized fingerprint of the wearable device, where the authorized fingerprint may be used as the pre-stored fingerprint.

In a possible technical solution, that the electronic device executes a function corresponding to the speech includes at least one of the following:

the electronic device executes a call making function corresponding to the speech; or the electronic device executes an SMS message sending function corresponding to the speech; or the electronic device executes an application starting function corresponding to the speech; or the electronic device executes a photographing function corresponding to the speech; or the electronic device executes a payment function corresponding to the speech.

According to a third aspect, a technical solution of this application provides a speech recognition method, including:

a wearable device collects a fingerprint pattern input by a user and speech input by the user, where the wearable device is woken up in response to the fingerprint input by the user;

the wearable device sends the fingerprint pattern to an electronic device, to enable the electronic device to perform authentication on the fingerprint pattern input by the user; and the wearable device sends the speech to the electronic device, and after the authentication succeeds, the electronic device is enabled to execute a function corresponding to the speech.

The wearable device and the electronic device may be wirelessly connected. For example, the wearable device and the electronic device are connected by using Bluetooth or wifi.

In a possible technical solution, the method includes: After the authentication succeeds, the electronic device is in an unlocked state.

In a possible technical solution, the method further includes: The wearable device stores the fingerprint pattern input by the user.

In a possible technical solution, the method further includes: When the wearable device is in a dormant state, the wearable device collects a wake-up phrase input by the user, and wakes up the wearable device.

The wearable device collects another speech input by the user, and sends the another speech and the fingerprint pattern that is stored in the wearable device to the electronic device.

In a possible technical solution, the method further includes: The wearable device discards the fingerprint pattern. In this way, when a Bluetooth headset collects again the fingerprint pattern input by the user, the Bluetooth headset may be woken up. The Bluetooth headset may send, to a mobile phone, the collected fingerprint pattern input by the user, and the mobile phone performs authentication.

In a possible technical solution, after it is detected that the user removes the Bluetooth headset, the Bluetooth headset may discard the fingerprint pattern input by the user.

According to a fourth aspect, a technical solution of this application provides an electronic device, including a processor and a communications module.

The processor receives, by using the communications module, a fingerprint pattern input by a user, where the fingerprint pattern input by the user is collected by a wearable device, and the wearable device is in wireless communication with the electronic device.

The processor receives, by using the communications module, speech input by the user, where the speech input by the user is collected by the wearable device.

The processor performs authentication on the fingerprint pattern input by the user, and after the authentication succeeds, the electronic device executes a function corresponding to the speech.

The communications module may be a Bluetooth communications module or a wifi communications module.

In a possible technical solution, after the authentication performed by the processor on the fingerprint pattern input by the user succeeds, the electronic device is in an unlocked state.

In a possible technical solution, before the processor receives, by using the communications module, the fingerprint pattern input by the user, the electronic device is in a screen-locked state.

In a possible technical solution, that the processor performs authentication on the fingerprint pattern input by the user includes:

the processor compares the fingerprint pattern input by the user with a pre-stored fingerprint.

In a possible technical solution, the electronic device further includes a touchscreen, and in response to triggering by the user, the processor controls the touchscreen to display a management interface of the wearable device.

In a possible technical solution, that the processor executes a function corresponding to the speech includes at least one of the following:

the processor executes a call making function corresponding to the speech; or the processor executes an SMS message sending function corresponding to the speech; or the processor executes an application starting function corresponding to the speech; or the processor executes a photographing function corresponding to the speech; or the electronic device executes a payment function corresponding to the speech.

According to a fifth aspect, a technical solution of this application provides a wearable device, including a fingerprint sensor, a speech sensor, a communications module, and a processor.

The fingerprint sensor is configured to collect a fingerprint pattern input by a user.

The speech sensor is configured to collect speech input by the user.

The processor is configured to send, by using the communications module, the fingerprint pattern collected by the fingerprint sensor and the speech collected by the speech sensor.

In a possible technical solution, if the wearable device is in a dormant state, when the fingerprint sensor collects the fingerprint pattern input by the user, the wearable device may be woken up. For example, the processor may wake up the wearable device.

In a possible technical solution, when the wearable device is in a dormant state, the speech sensor is configured to collect a wake-up phrase input by the user, and the processor wakes up the wearable device based on the wake-up phrase.

In a possible technical solution, the fingerprint pattern input by the user is stored in the wearable device.

In a possible technical solution, the speech sensor is configured to collect another speech input by the user, and the processor is configured to send the another speech and the fingerprint pattern that is stored in the wearable device to the electronic device by using the communications module.

In a possible technical solution, the processor discards the fingerprint pattern.

In a possible technical solution, after the user wears the wearable device, the user may be prompted, through vibration, speech, or light, to input a fingerprint on the fingerprint sensor.

According to a sixth aspect, a technical solution of this application provides a wearable device, including: a fingerprint sensor, one or more processors, and a memory. The processor is coupled to the memory, and one or more programs are stored in the memory. When the wearable device runs, the processor executes the one or more programs stored in the memory, to enable the wearable device to perform the speech recognition method of any wearable device above.

The fingerprint sensor may be disposed at a side that is not in contact with a user when the wearable device is worn. The wearable device may be a Bluetooth headset, smart glasses, a smart watch, or the like.

According to a seventh aspect, a technical solution of this application provides a non-transitory computer-readable storage medium, including a computer instruction. When the computer instruction is run on a wearable device, the wearable device is enabled to perform the speech recognition method of any wearable device above.

According to an eighth aspect, a technical solution of this application provides a computer program product. When the computer program product runs on a wearable device, the wearable device is enabled to perform the speech recognition method of any wearable device above.

According to a ninth aspect, a technical solution of this application provides a speech recognition system, including a wearable device and an electronic device. The wearable device is in wireless communication with the electronic device, for example, are connected through Bluetooth wireless communication, or are connected through wifi wireless communication.

The wearable device collects a fingerprint pattern input by a user, for example, collects, by using a fingerprint sensor, the fingerprint pattern input by the user.

The wearable device collects speech input by the user, for example, collects, by using a speech sensor, the speech input by the user.

The wearable device or the electronic device performs authentication on the fingerprint pattern input by the user, and after the authentication succeeds, the electronic device executes a function corresponding to the speech.

It may be learned that the wearable device may collect the fingerprint pattern input by the user, and the fingerprint pattern may be used to subsequently perform authentication on a user identity. In this way, the electronic device can subsequently implement a speech recognition function corresponding to a speech signal while the user does not need to interact with the electronic device.

In a possible technical solution, that the electronic device executes a function corresponding to the speech includes:
the wearable device recognizes a speech command in the speech, the wearable device sends the speech command to the electronic device, and the electronic device executes a function corresponding to the speech command; or
the electronic device may recognize a speech command in the speech, and the electronic device executes a function corresponding to the speech command; or
the wearable device sends the speech to a cloud server, the cloud server recognizes a speech command in the speech, the cloud server sends the speech command to the wearable device, the wearable device sends the speech command to the electronic device, and the electronic device executes a function corresponding to the speech command.

It may be understood that the cloud server may alternatively send the speech command to the electronic device, and the electronic device executes the function corresponding to the speech command.

In a possible technical solution, the wearable device may recognize the speech command in the speech, the wearable device sends the speech to the electronic device, and the electronic device may also recognize the speech command in the speech. In this way, the wearable device may also send the speech command to the electronic device, the electronic device may perform comparison to determine whether the speech command recognized by the electronic device is the same as the speech command recognized by the wearable device, and if the speech commands are the same, the electronic device may execute the function corresponding to the speech command, or if the speech commands are different, the electronic device may discard the speech command and not execute the function corresponding to the speech command. In this way, security can be better ensured.

In a possible technical solution, before the wearable device or the electronic device performs authentication on the fingerprint pattern input by the user, the electronic device may be in a screen-locked state. After the authentication succeeds, the electronic device may be in an unlocked state.

It may be understood that, before the wearable device or the electronic device performs authentication on the fingerprint pattern input by the user, the electronic device may be alternatively in a screen-off and screen-locked state. After the authentication succeeds, the electronic device may be in a screen-on and unlocked state.

Optionally, before the wearable device or the electronic device performs authentication on the fingerprint pattern input by the user, the electronic device may be alternatively in a screen-off state. After the authentication succeeds, the electronic device may be in a screen-on state.

In a possible technical solution, that the electronic device executes a function corresponding to the speech may be at least one of the following functions:
the electronic device executes a call making function corresponding to the speech; or
the electronic device executes an SMS message sending function corresponding to the speech; or
the electronic device executes an application starting function corresponding to the speech, for example, starting a WeChat application; or
the electronic device executes a photographing function corresponding to the speech, for example, starting a photographing application and performing photographing; or
the electronic device executes a payment function corresponding to the speech, for example, starting Alipay and completing payment.

In a possible technical solution, that the wearable device or the electronic device performs authentication on the fingerprint pattern input by the user includes:
the wearable device compares a pre-stored fingerprint with the fingerprint pattern input by the user; or
the electronic device compares a pre-stored fingerprint with the fingerprint pattern input by the user.

The pre-stored fingerprint may be preset by the user. The pre-stored fingerprint may be stored in the wearable device, or may be stored in the electronic device. It may be understood that the pre-stored fingerprint may be alternatively stored in both the wearable device and the electronic device.

In a possible technical solution, after the user wears the wearable device, the user may be prompted, through vibration, speech, or light, to input a fingerprint on the fingerprint sensor of the wearable device. In this way, user experience is better.

In a possible technical solution, if the wearable device or the electronic device performs authentication on the fingerprint pattern input by the user, and the authentication fails, the wearable device or the electronic device may discard the fingerprint pattern input by the user. In this way, the fingerprint pattern can be prevented from being stolen, and therefore security is ensured.

In a possible technical solution, the fingerprint pattern input by the user may be stored in the wearable device.

In a possible technical solution, when the wearable device is in a dormant state, the wearable device collects a wake-up phrase input by the user, and wakes up the wearable device. The wearable device may collect another speech input by the user, and send the another speech and the fingerprint pattern that is stored in the wearable device to the electronic device.

In this way, the electronic device may compare the received fingerprint pattern sent by the wearable device with the pre-stored fingerprint, and may execute a function corresponding to the another speech after authentication succeeds. For example, Alipay is started to complete payment.

It may be understood that the wearable device may collect the wake-up phrase and the another speech that are input by the user, and send the wake-up phrase, the another speech, and the stored fingerprint pattern to the electronic device. In this case, the electronic device may be woken up by using the wake-up phrase, and the electronic device may compare the received fingerprint pattern sent by the wearable device with the pre-stored fingerprint, and may execute a function corresponding to the another speech after authentication succeeds. For example, Alipay is started to complete payment.

It may be understood that the wake-up phrase may wake up the wearable device, may wake up the electronic device, or may wake up the wearable device and the electronic device.

In a possible technical solution, the wearable device may discard the collected fingerprint pattern input by the user. In this way, when collecting again the fingerprint pattern input by the user, the wearable device may be woken up. The wearable device may send the collected fingerprint pattern input by the user to the electronic device, and the electronic device performs authentication.

In a possible technical solution, after it is detected that the user removes the wearable device, the wearable device may discard the fingerprint pattern input by the user.

It may be understood that the wearable device is used as an example for description above, and another wearable device may also be used, for example, another wearable device such as smart glasses or a smart wristwatch. Certainly, the wearable device is also a wearable device. The electronic device is used as an example for description above, and another electronic device such as a tablet computer or a notebook computer may also be used. Certainly, the electronic device is also an electronic device.

The speech recognition method in the first aspect to the speech recognition system in the ninth aspect have respective focuses and may be mutually referenced.

It may be understood that, for beneficial effects that can be achieved by the speech recognition method according to the third aspect, the electronic device according to the fourth aspect, the wearable device according to the fifth aspect, the wearable device according to the sixth aspect, the non-transitory computer-readable storage medium according to the seventh aspect, the computer program product according to the eighth aspect, and the speech recognition system according to the ninth aspect, refer to beneficial effects in the corresponding methods provided above. Details are not described herein.

DESCRIPTION OF EMBODIMENTS

The following describes the implementations of some embodiments of this application in detail with reference to accompanying drawings.

Figure 1:
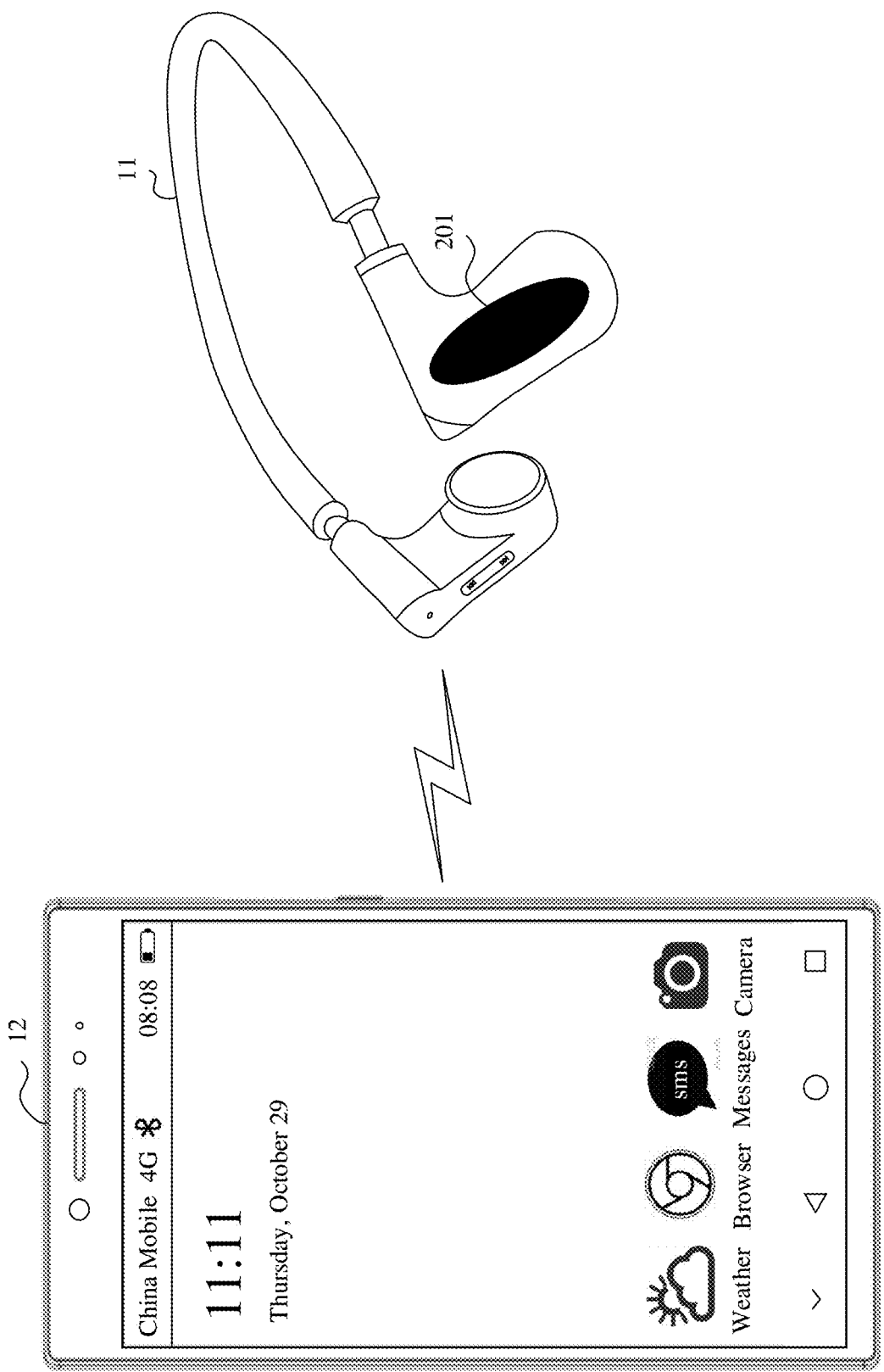
FIG. 1 is a schematic diagram of a speech recognition system including a wearable device and a terminal according to at least one embodiment of this application.

As shown in FIG. 1, a speech recognition method provided in at least one embodiment of this application may be applied to a speech recognition system including a wearable device 11 and a terminal 12. A wireless communication connection or a wired communication connection may be established between the wearable device 11 and the terminal 12.

The wearable device 11 may be a wireless headset, a wired headset, smart glasses, a smart helmet, a smart wristwatch, or the like. The terminal 12 may be a device such as a mobile phone, a tablet computer, a notebook computer, an ultra-mobile personal computer (Ultra-mobile Personal Computer, UMPC), or a personal digital assistant (Personal Digital Assistant, PDA). This is not limited in at least one embodiment of this application.

For example, the wearable device 11 is a Bluetooth headset. As shown in FIG. 1, a fingerprint sensor 201 is disposed on the Bluetooth headset in at least one embodiment of this application. The fingerprint sensor 201 may be disposed at a side of the Bluetooth headset that is not in contact with a user after the user wears the Bluetooth headset. For example, the fingerprint sensor 201 may be disposed on a housing of the Bluetooth headset, or the fingerprint sensor 201 may be separately disposed as a control module connected to a housing of the Bluetooth headset.

For example, when a finger of the user touches a collection surface exposed on the fingerprint sensor 201, the fingerprint sensor 201 may collect a fingerprint pattern formed by the finger of the user on the collection surface. For example, a fingerprint sensor 201 shown in FIG. 2 includes a plurality of sensing units 201b arranged in an array, and a collection surface 201a that covers the sensing units 201b. A fingerprint on a finger of the user usually includes a valley (valley) and a ridge (ridge). After the finger of the user comes into contact with the collection surface 201a of the fingerprint sensor 201, because a human body is a conductive medium, the sensing unit 201b in the fingerprint sensor 201 may generate electrical signals respectively corresponding to the valley and the ridge. For example, the sensing unit 201b is an induction capacitor. A capacitance difference generated by an induction capacitor corresponding to the valley in the fingerprint is a first capacitance difference, and a capacitance difference generated by an induction capacitor corresponding to the ridge in the fingerprint is a second capacitance difference. Therefore, a fingerprint pattern of the user may be drawn based on capacitance differences at different locations on the fingerprint sensor 201.

In addition, if the fingerprint sensor 201 is an optical fingerprint sensor, the sensing unit 201b may be specifically a photoelectric sensor (for example, a photodiode or a phototriode). Certainly, the fingerprint sensor 201 may be a capacitive fingerprint sensor, an optical fingerprint sensor, a radio frequency fingerprint sensor, an ultrasonic fingerprint sensor, or the like. This is not limited in at least one embodiment of this application.

Figure 3:
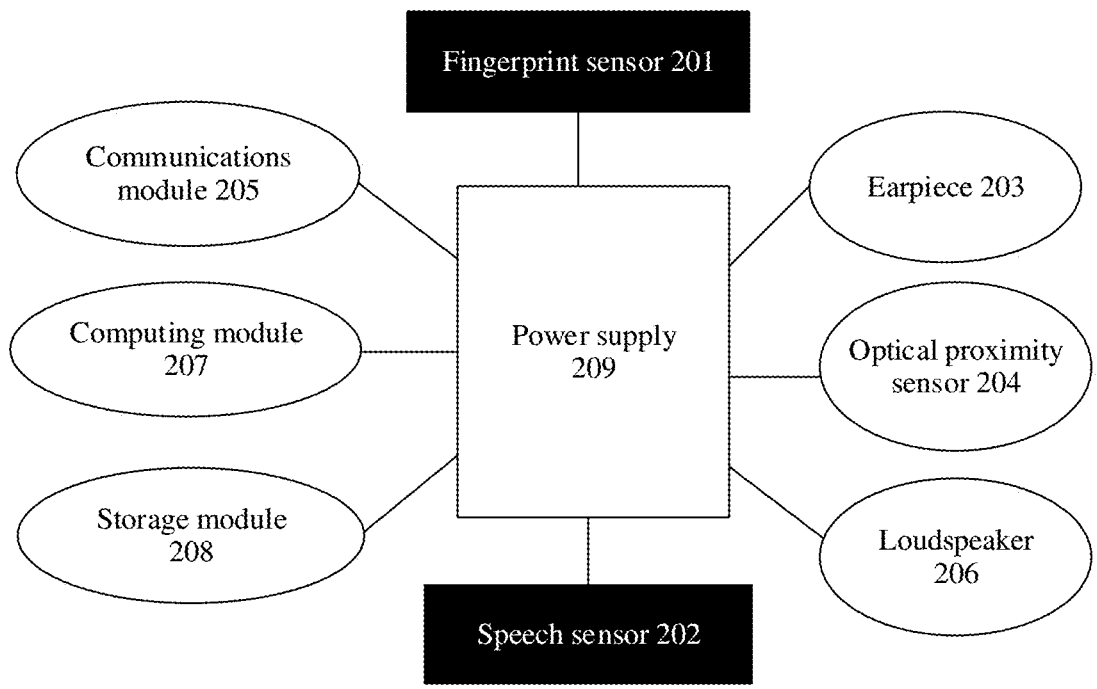
FIG. 3 is a schematic diagram of a wearable device according to at least one embodiment of this application.

Further, as shown in FIG. 3, in addition to the fingerprint sensor 201, the wearable device 11 may further include a speech sensor 202, and the speech sensor 202 may be configured to collect a speech signal generated when the user makes a sound. Specifically, the speech sensor 202 may collect a vibration signal generated when the user makes a sound by using a medium (for example, air, skin, or a bone), and convert the collected vibration signal into a speech signal in an electrical signal form. In this way, based on the speech signal collected by the speech sensor 202, the wearable device 11 or the terminal 12 may recognize speech content in the speech signal by using a speech recognition algorithm.

For example, the speech sensor 202 may include an air conduction microphone. A manner in which the air conduction microphone collects a speech signal is that a vibration signal generated when the user makes a sound is transmitted to the microphone through air.

Alternatively, the speech sensor 202 may include a bone conduction microphone. A manner in which the bone conduction microphone collects a speech signal is that a vibration signal generated when the user makes a sound is transmitted to the microphone by using a bone. When the speech sensor 202 is a bone conduction microphone, the bone conduction microphone also needs to be disposed at a side that is of the wearable device 11 and that can be directly in contact with the user when the user wears the wearable device 11, so that the bone conduction microphone can collect the speech signal obtained after bone transmission.

Alternatively, the speech sensor 202 may include an acceleration sensor. The acceleration sensor may be disposed at a side that is of the wearable device 11 and that can be directly in contact with the user when the user wears the wearable device 11, or the acceleration sensor may be disposed on a housing that is of the wearable device 11 and that can be directly in contact with the user when the user wears the wearable device 11. The Bluetooth headset is still used as an example of the wearable device 11. The acceleration sensor may be disposed near an earpiece of the Bluetooth headset. In this way, after the user wears the Bluetooth headset, the acceleration sensor may detect a vibration signal generated on skin that is in contact with the acceleration sensor, and the vibration signal is actually caused when speech made by the user is propagated by using a body of the user as a medium.

In at least one embodiment of this application, after the wearable device 11 establishes a connection to the terminal 12, the wearable device 11 may not only collect, by using the speech sensor 202, the speech signal generated when the user makes a sound, but may also collect, by using the fingerprint sensor 201, a fingerprint input by the user. The collected fingerprint may be subsequently used to perform authentication on a user identity, and the collected speech signal may be subsequently used to perform speech recognition. In this way, if the terminal 12 needs to perform authentication on the user identity when implementing a speech recognition function, for example, if the terminal 12 is in a screen-locked state, or when the speech signal input by the user includes sensitive information such as "payment" related to money or privacy, the wearable device 11 (or the terminal 12) may perform authentication on the user identity based on the fingerprint collected by the fingerprint sensor 201, and further determine, based on an authentication result, whether to execute a related instruction in the speech signal.

In other words, in a speech recognition scenario in which authentication needs to be performed on the user identity, the user only needs to interact with the wearable device 11 to control the terminal 12 to implement an identity authentication process and a speech recognition process. Compared with other approaches in which the user needs to separately operate the terminal 12 to input identity authentication information (for example, the fingerprint) to the terminal 12, and operate the wearable device 11 to input the speech signal to the wearable device 11, the speech recognition method provided in this application can ensure security of the speech recognition scenario, and reduce interaction complexity caused because the user needs to frequently operate the terminal 12 when the user wears the wearable device 11 to perform speech recognition, so that the user can implement a secure and effective speech recognition function without using the terminal 12.

It should be noted that after collecting the fingerprint and the speech signal that are input by the user, the wearable device 11 needs to perform authentication on the user identity based on the collected fingerprint and perform speech recognition on the collected speech signal. In at least one embodiment of this application, the wearable device 11 may perform the foregoing identity authentication process and/or speech recognition process, or the wearable device 11 may send the collected fingerprint and/or speech signal to the terminal 12, and the terminal 12 performs the foregoing identity authentication process and/or speech recognition process. A specific implementation process of the foregoing identity authentication process and/or speech recognition process is described in detail in subsequent embodiments, and details are not described herein.

Further, as still shown in FIG. 3, in addition to the fingerprint sensor 201 and the speech sensor 202, the wearable device 11 may further include components such as an earpiece 203, an optical proximity sensor 204, a communications module 205, a loudspeaker 206, a computing module 207, a storage module 208, and a power supply 209. It may be understood that the wearable device 11 may have more or fewer components than those shown in FIG. 3, may combine two or more components, or may have different component configurations. The components shown in FIG. 3 may be implemented in hardware, software, or a combination of hardware and software including one or more signal processing or application specific integrated circuits.

It should be noted that the Bluetooth headset is used as the wearable device 11 as examples for description in the foregoing embodiments. It may be further understood that the fingerprint sensor 201 and the speech sensor 202 may be disposed in another wearable device such as smart glasses, a smart helmet, or a smart band, to collect the fingerprint pattern and the speech signal that are input by the user.

Figure 4:
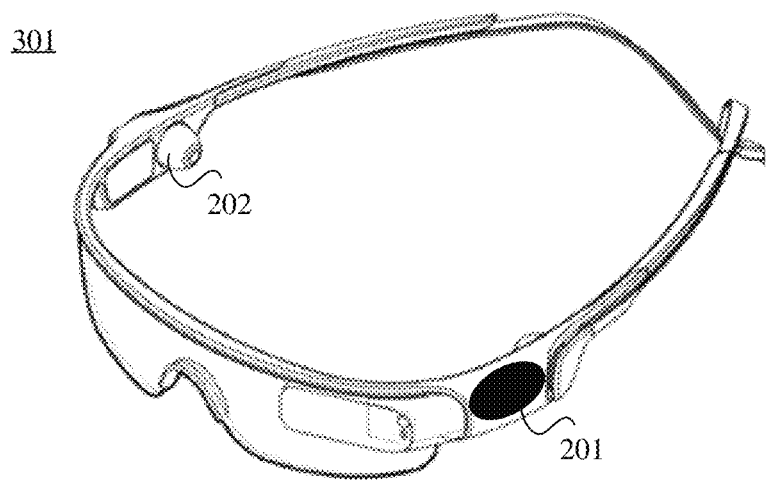
FIG. 4 is a schematic diagram of smart glasses according to at least one embodiment of this application.

For example, as shown in FIG. 4, the fingerprint sensor 201 and the speech sensor 202 may be integrated into smart glasses 301. For example, the fingerprint sensor 201 may be disposed on a glasses frame or a spectacle frame of the smart glasses 301. When the finger of the user touches the fingerprint sensor 201 on the smart glasses 301, the fingerprint sensor 201 may collect, at a specific frequency, a fingerprint pattern formed on the fingerprint sensor 201. For another example, the speech sensor 202 on the smart glasses 301 may include a bone conduction microphone that is disposed at a location such as a spectacle frame that can be in contact with the user. When the user wears the smart glasses 301 and makes a sound, the speech sensor 202 may collect a speech signal conducted through a bone of the user.

In a speech recognition scenario in which authentication needs to be performed on the user identity, the smart glasses 301 (or a terminal connected to the smart glasses 301) may perform authentication on the user identity by using the fingerprint pattern collected by the fingerprint sensor 201, and recognize a related instruction in the speech signal collected by the speech sensor 202. When it is recognized that the user is an authorized user, for example, the authentication succeeds, the terminal may be triggered to implement the related instruction in the speech signal, to avoid interaction complexity caused because the user not only needs to operate the terminal to perform identity authentication, but also needs to operate the wearable device to input the speech signal.

Figure 5:
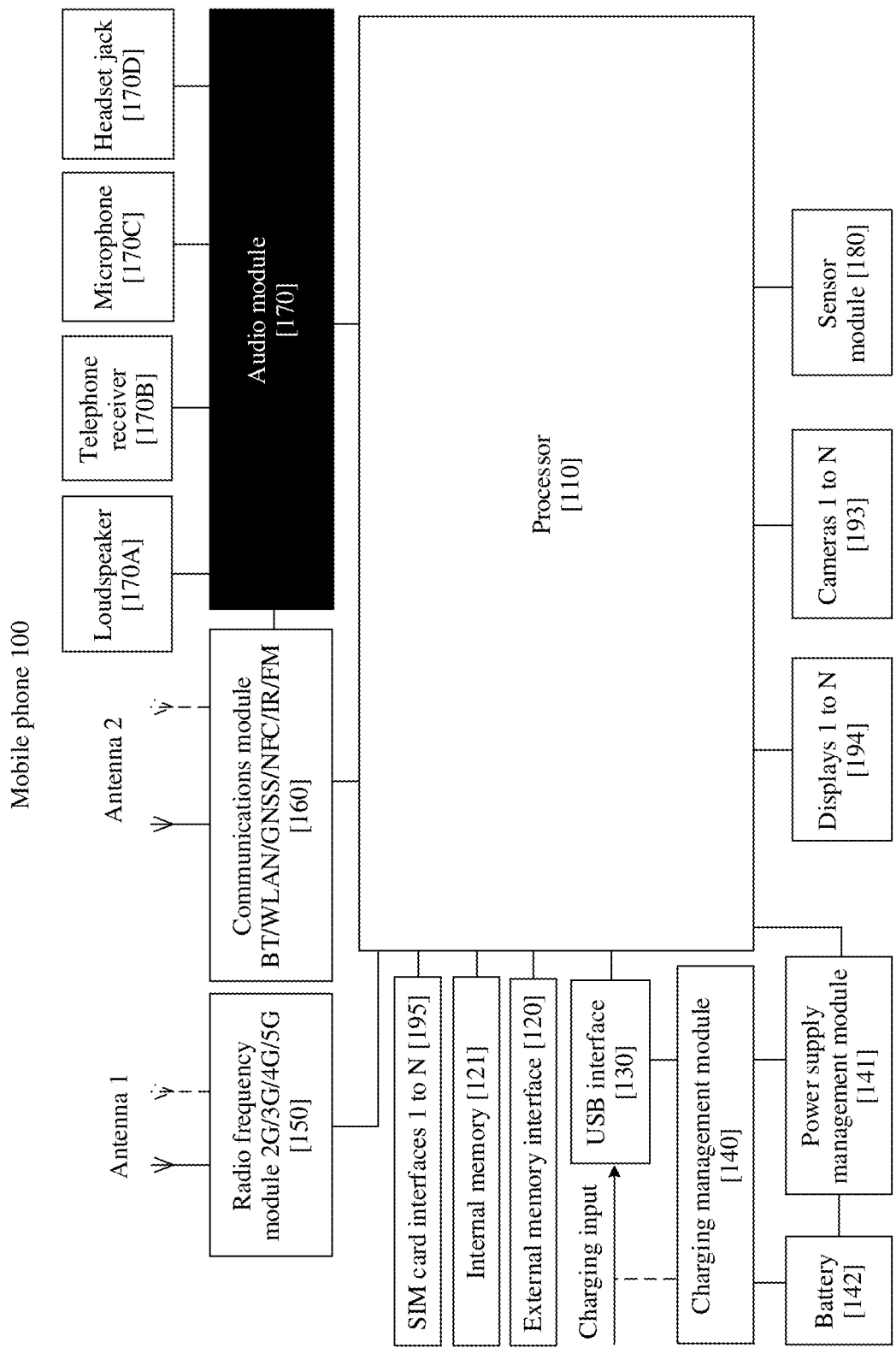
FIG. 5 is a schematic diagram of a mobile phone according to at least one embodiment of this application.

As shown in FIG. 5, the terminal 12 in the speech recognition system may be specifically a mobile phone 100. The mobile phone 100 may include a processor 110, an external memory interface 120, an internal memory 121, a USB interface 130, a charging management module 140, a power management module 141, a battery 142, an antenna 1, an antenna 2, a radio frequency module 150, a communications module 160, an audio module 170, a loudspeaker 170A, a telephone receiver 170B, a microphone 170C, a headset jack 170D, a sensor module 180, a camera 193, a display 194, a SIM card interface 195, and the like.

A structure shown in at least one embodiment does not constitute a limitation on the mobile phone 100. More or fewer components than those shown in the figure may be included, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (Neural-network Processing Unit, NPU). Different processing units may be independent components, or may be integrated into a same processor.

The controller may be a decision maker that directs components of the mobile phone 100 to work coordinately according to an instruction. The controller is a nerve center and a command center of the mobile phone 100. The controller generates an operation control signal based on instruction operation code and a time sequence signal, to control a fetch instruction and an execute instruction.

A memory may be further disposed in the processor 110, and is configured to store an instruction and data. In some embodiments, the memory in the processor is a cache. The memory may store an instruction or data that has just been used or cyclically used by the processor. If the processor needs to use the instruction or the data again, the processor may directly invoke the instruction or the data from the memory. Repeated access is avoided, and waiting time of the processor is reduced, and therefore system efficiency is improved.

In some embodiments, the processor 110 may include an interface. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, and includes a serial data line (serial data line, SDA) and a derail clock line (derail clock line, SCL). In some embodiments, the processor may include a plurality of groups of I2C buses. The processor may be separately coupled to a touch sensor, a charger, a flash, a camera, and the like by using different I2C bus interfaces. For example, the processor may be coupled to the touch sensor by using the I2C interface, so that the processor communicates with the touch sensor by using the I2C bus interface, to implement a touch function of the mobile phone 100.

The I2S interface may be used for audio communication. In some embodiments, the processor may include a plurality of groups of I2S buses. The processor may be coupled to the audio module by using the I2S bus, to implement communication between the processor and the audio module. In some embodiments, the audio module may transmit an audio signal to the communications module by using the I2S interface, to implement a function of answering a call by using a Bluetooth headset.

The PCM interface may also be used for audio communication, and analog signal sampling, quantization, and encoding. In some embodiments, the audio module and the communications module may be coupled by using a PCM bus interface. In some embodiments, the audio module may transmit an audio signal to the communications module by using the PCM interface, to implement a function of answering a call by using a Bluetooth headset. Both the I2S interface and the PCM interface may be used for audio communication, and sampling rates of the two interfaces are different.

The UART interface is a universal serial data bus used for asynchronous communication. The bus is a bidirectional communications bus. The bus converts to-be-transmitted data between serial communication and parallel communication. In some embodiments, the UART interface is usually configured to connect the processor and the communications module 160. For example, the processor communicates with a Bluetooth module by using the UART interface, to implement a Bluetooth function. In some embodiments, the audio module may transmit an audio signal to the communications module by using the UART interface, to implement a function of playing music by using a Bluetooth headset.

The MIPI interface may be configured to connect the processor to a peripheral component such as the display or the camera. The MIPI interface includes a camera serial interface (camera serial interface, CSI), a display serial interface (display serial interface, DSI), and the like. In some embodiments, the processor communicates with the camera by using the CSI interface, to implement a photographing function of the mobile phone 100. The processor communicates with the display by using the DSI interface, to implement a display function of the mobile phone 100.

The GPIO interface may be configured by using software. The GPIO interface may be configured as a control signal, or may be configured as a data signal. In some embodiments, the GPIO interface may be configured to connect the processor to the camera, the display, the communications module, the audio module, a sensor, and the like. The GPIO interface may also be configured as an I2C interface, an I2S interface, a UART interface, a MIPI interface, or the like.

The USB interface 130 may be a mini USB interface, a micro USB interface, a USB Type C interface, or the like. The USB interface may be configured to connect to the charger to charge the mobile phone 100, may be configured to transmit data between the mobile phone 100 and the peripheral component, may be configured to connect to a headset and play audio by using the headset, or may be configured to connect to another electronic device such as an AR device.

An interface connection relationship between modules shown in at least one embodiment is merely a schematic description, and does not limit a structure of the mobile phone 100. The mobile phone 100 may use different interface connection manners or a combination of a plurality of interface connection manners in at least one embodiment.

The charging management module 140 is configured to receive charging input from the charger. The charger may be a wireless charger, or may be a wired charger. In some embodiments of wired charging, the charging management module may receive charging input from the wired charger by using the USB interface. In some embodiments of wireless charging, the charging management module may receive wireless charging input by using a wireless charging coil of the mobile phone 100. When charging the battery, the charging management module may further supply power to a terminal device by using the power management module 141.

The power management module 141 is configured to connect the battery 142, the charging management module 140, and the processor 110. The power management module receives input of the battery and/or the charging management module, and supplies power to the processor, the internal memory, an external memory, the display, the camera, the communications module, and the like. The power management module may be further configured to monitor parameters such as a battery capacity, a battery cycle quantity, and a battery health status (electric leakage and impedance). In some embodiments, the power management module 141 may also be disposed in the processor 110. In some embodiments, the power management module 141 and the charging management module may be alternatively disposed in a same component.

A wireless communication function of the mobile phone 100 may be implemented by using an antenna module 1, an antenna module 2, the radio frequency module 150, the communications module 160, a modem, the baseband processor, and the like.

The antenna 1 and the antenna 2 are configured to transmit and receive an electromagnetic wave signal. Each antenna in the mobile phone 100 may be configured to cover a single communications frequency band or a plurality of communications frequency bands. Different antennas may be further multiplexed to improve antenna utilization. For example, a cellular network antenna may be multiplexed as a diversity antenna of a wireless local area network. In some embodiments, the antenna may be used in combination with a tuning switch.

The radio frequency module 150 may provide a communication processing module for a wireless communication solution including 2G/3G/4G/5G that is applied to the mobile phone 100. The radio frequency module 150 may include at least one filter, a switch, a power amplifier, a low noise amplifier (low noise amplifier, LNA), and the like. The radio frequency module receives an electromagnetic wave by using the antenna 1, performs processing such as filtering and amplification on the received electromagnetic wave, and transmits the electromagnetic wave to the modem for demodulation. The radio frequency module may further amplify a signal modulated by the modem, convert the signal into an electromagnetic wave by using the antenna 1, and radiate the electromagnetic wave. In some embodiments, at least some function modules of the radio frequency module 150 may be disposed in the processor 150. In some embodiments, at least some function modules of the radio frequency module 150 and at least some modules of the processor 110 may be disposed in a same component.

The modem may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a speech signal by using an audio device (not limited to the loudspeaker, the telephone receiver, and the like), or displays an image or a video by using the display. In some embodiments, the modem may be an independent component. In some embodiments, the modem may be independent of the processor, and is disposed in a same component with the radio frequency module or another function module.

The communications module 160 may provide a communication processing module for a wireless communication solution that is applied to the mobile phone 100, such as a wireless local area network (wireless local area networks, WLAN), Bluetooth (bluetooth, BT), a global navigation satellite system (global navigation satellite system, GNSS), frequency modulation (frequency modulation, FM), a near field wireless communication (near field communication, NFC) technology, and an infrared (infrared, IR) technology. The communications module 160 may be one or more components integrated with at least one communication processing module. The communications module receives an electromagnetic wave by using the antenna 2, performs frequency modulation and filtering processing on an electromagnetic wave signal, and sends a processed signal to the processor. The communications module 160 may further receive a to-be-sent signal from the processor, perform frequency modulation and amplification on the signal, convert the signal into an electromagnetic wave by using the antenna 2, and radiate the electromagnetic wave.

In some embodiments, the antenna 1 of the mobile phone 100 is coupled to the radio frequency module, and the antenna 2 is coupled to the communications module, so that the mobile phone 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), BT, GNSS, WLAN, NFC, FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The mobile phone 100 implements a display function by using the GPU, the display 194, the application processor, and the like. The GPU is a microprocessor for image processing, and is connected to the display and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display includes a display panel. The display panel may be an LCD (liquid crystal display, liquid crystal display), an OLED (organic light-emitting diode, organic light-emitting diode), an active matrix organic light-emitting diode (active-matrix organic light emitting diode, AMOLED), a mini LED, a micro LED, a micro-oLED, a quantum dot light-emitting diode (quantum dot light emitting diodes, QLED), or the like. In some embodiments, the mobile phone 100 may include one or N displays, where N is a positive integer greater than 1.

Still as shown in FIG. 1, the mobile phone 100 may implement a photographing function by using the ISP, the camera 193, the video codec, the GPU, the display, the application processor, and the like.

The ISP is configured to process data fed back by the camera. For example, during photographing, a shutter is turned on, and light is transmitted to a photosensitive element of the camera by using a lens, so that an optical signal is converted into an electrical signal, and the photosensitive element of the camera transmits the electrical signal to the ISP for processing, to convert the electrical signal into a macroscopic image. The ISP may further perform algorithm optimization on image noise, luminance, and complexion. The ISP may further optimize parameters such as exposure to a shooting scenario and color temperature. In some embodiments, the ISP may be disposed in the camera 193.

The camera 193 is configured to capture a static image or a video. An optical image of an object is generated by using the lens and is projected to the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras, where N is a positive integer greater than 1.

The digital signal processor is configured to process a digital signal, and may process another digital signal in addition to the digital image signal. For example, when the mobile phone 100 selects a frequency, the digital signal processor is configured to perform Fourier transform or the like on frequency energy.

The video codec is configured to compress or decompress a digital video. The mobile phone 100 may support one or more types of video codecs. In this way, the mobile phone 100 may play or record videos in a plurality of coding formats, such as MPEG1, MPEG 2, MPEG3, and MPEG4.

The NPU is a neural network (neural-network, NN) computing processor, performs fast processing on input information by referring to a structure of a biological neural network, for example, by referring to a transmission mode between neurons in a human brain, and may further continuously perform self-learning. An application such as intelligent cognition of the mobile phone 100 may be implemented by using the NPU, such as image recognition, facial recognition, speech recognition, and text understanding.

The external memory interface 120 may be configured to connect to an external storage card such as a micro SD card, to extend a storage capability of the mobile phone 100. The external storage card communicates with the processor by using the external memory interface, to implement a data storage function. For example, files such as music and a video are stored in the external storage card.

The internal memory 121 may be configured to store computer executable program code, and the executable program code includes an instruction. The processor 110 performs various functional applications and data processing of the mobile phone 100 by running the instruction stored in the internal memory 121. The memory 121 may include a program storage area and a data storage area. The program storage area may store an operating system, an application program required by at least one function (such as a sound playing function and an image playing function), and the like. The data storage area may store data (such as audio data and a phone book) and the like created during use of the mobile phone 100. In addition, the memory 121 may include a high-speed random access memory, and may further include a non-volatile memory such as at least one magnetic disk storage component, a flash memory component, another volatile solid-state storage component, or a universal flash storage (universal flash storage, UFS).

The mobile phone 100 may implement an audio function such as music playing and recording by using the audio module 170, the loudspeaker 170A, the telephone receiver 170B, the microphone 170C, the headset jack 170D, the application processor, and the like.

The audio module is configured to convert digital audio information into analog audio signal output, and is also configured to convert analog audio input into a digital audio signal. The audio module may be further configured to encode and decode an audio signal. In some embodiments, the audio module may be disposed in the processor 110, or some function modules of the audio module are disposed in the processor 110.

In at least one embodiment of this application, the audio module 170 may receive, by using the I2S interface, a speech signal transmitted by the communications module 160, to implement functions such as answering a call and playing music by using a wearable device. For example, the Bluetooth headset may send a collected speech signal to the communications module 160 of the mobile phone 100, and the communications module 160 transmits the speech signal to the audio module 170. The audio module 170 may perform speech recognition on the received speech signal by using a speech recognition algorithm, to obtain specific audio information in the speech signal, for example, "Hello, E" and "Call Zhang San". Further, based on the recognized audio information, the audio module 170 may wake up the processor 110 to execute a speech command corresponding to the specific audio information, for example, start a voice assistant APP or start a music APP to play music.

Alternatively, the audio module 170 may perform analog-to-digital conversion on a received speech signal, and send a speech signal obtained after analog-to-digital conversion to the processor 110. The processor 110 performs speech recognition on the speech signal by using a speech recognition algorithm, to obtain specific audio information in the speech signal, and executes a speech command corresponding to the specific audio information.

The loudspeaker 170A, also referred to as a "loudspeaker", is configured to convert an audio electrical signal into a speech signal. The mobile phone 100 may listen to music or answer a hands-free call by using the loudspeaker.

The telephone receiver 170B, also referred to as an "earpiece", is configured to convert an audio electrical signal into a speech signal. When the mobile phone 100 answers a call or receives speech information, the telephone receiver may be placed close to a human ear to listen to speech.

The microphone 170C, also referred to as a "microphone" or "microphone", is configured to convert a speech signal into an electrical signal. When making a call or sending speech information, a user may make a sound by approaching a mouth to the microphone, and input the speech signal to the microphone. At least one microphone may be disposed in the mobile phone 100. In some embodiments, two microphones may be disposed in the mobile phone 100, and may implement a noise reduction function in addition to collecting the speech signal. In some embodiments, three, four, or more microphones may be alternatively disposed in the mobile phone 100, to collect the speech signal, reduce noise, identify a sound source, implement a directional recording function, and the like.

The headset jack 170D is configured to connect to a wired headset. The headset jack may be a USB interface, or may be a 3.5 mm start mobile electronic device platform (start mobile terminal platform, OMTP) standard interface, or a cellular telecommunications industry association of the USA (cellular telecommunications industry association of the USA, CTIA) standard interface.

The sensor module 180 of the mobile phone 100 may specifically include a pressure sensor, a gyroscope sensor, a barometric pressure sensor, a magnetic sensor (such as a Hall effect sensor), an acceleration sensor, a distance sensor, an optical proximity sensor, an ambient light sensor, a fingerprint sensor, a temperature sensor, a bone conduction sensor, a touch sensor, and the like. The touch sensor is also referred to as a "touch panel", may be disposed on the display, and is configured to detect a touch operation performed on or near the touch sensor. The detected touch operation may be transferred to the application processor to determine a touch event type, and corresponding visual output is provided by using the display.

The terminal 11 may further include components such as the USB interface 130, the charging management module 140, the power management module 141, the battery 142, and the SIM card interface 195. This is not limited in at least one embodiment of this application.

It may be understood that the terminal in the foregoing at least one embodiment may be an electronic device.

The processor in the terminal receives, by using the communications module, a fingerprint pattern input by a user, the fingerprint pattern input by the user is collected by a wearable device, and the wearable device is in wireless communication with the electronic device, for example, are connected by using Bluetooth or wifi.

The processor receives, by using the communications module, speech input by the user, where the speech input by the user is collected by the wearable device.

The processor performs authentication on the fingerprint pattern input by the user, and after the authentication succeeds, the electronic device executes a function corresponding to the speech.

In some embodiments of this application, before the processor receives, by using the communications module, the fingerprint pattern input by the user, the electronic device is in a screen-locked state. After the authentication performed by the processor on the fingerprint pattern input by the user succeeds, the electronic device is in an unlocked state.

In some embodiments of this application, in response to a triggering operation of the user on a touchscreen, the processor controls the touchscreen to display a management interface of the wearable device.

For ease of understanding, a speech recognition method provided in some embodiments of this application is specifically described below with reference to the accompanying drawings. In the following embodiments, a mobile phone is used as the terminal 12, the terminal 12 may be an electronic device, and a Bluetooth headset is used as the wearable device 11 for description.

First, still as shown in FIG. 1, a Bluetooth connection is established between the mobile phone and the Bluetooth headset.

Specifically, when a user wants to use the Bluetooth headset, a Bluetooth function of the Bluetooth headset may be enabled. In this case, the Bluetooth headset may send pairing broadcast to the outside. If the Bluetooth function has been enabled on the mobile phone, the mobile phone may receive the pairing broadcast and notify the user that a related Bluetooth device has been scanned. After the user selects, on the mobile phone, the Bluetooth headset as a connection device, the mobile phone may pair with the Bluetooth headset and establish the Bluetooth connection. Subsequently, the mobile phone and the Bluetooth headset may communicate with each other by using the Bluetooth connection. Certainly, if the mobile phone has been paired with the Bluetooth headset before the current Bluetooth connection is established, the mobile phone may automatically establish the Bluetooth connection to the scanned Bluetooth headset. In this manner, a wireless connection can be established between the mobile phone and the Bluetooth headset.

Alternatively, if a headset used by the user has a Wi-Fi function, the user may also operate the mobile phone to establish a Wi-Fi connection to the headset. Alternatively, if a headset used by the user is a wired headset, the user may also insert a plug of a headset cable into a corresponding headset jack of the mobile phone to establish a wired connection. This is not limited in at least one embodiment of this application.

Figure 6:
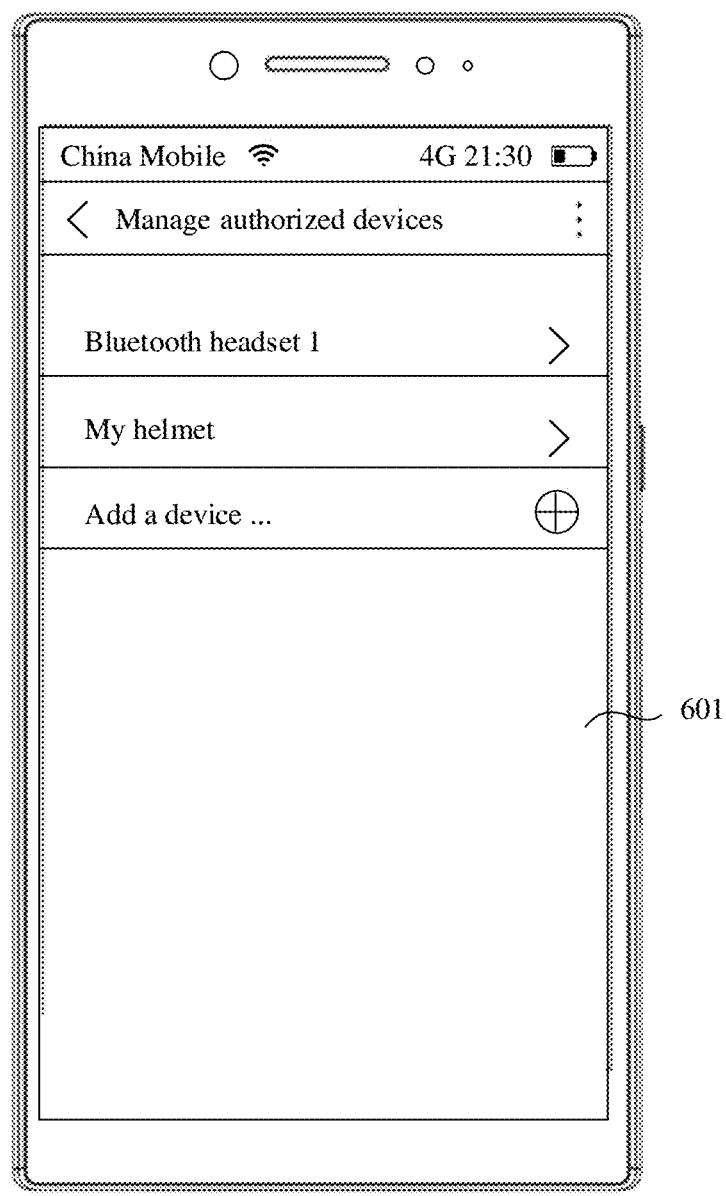
FIG. 6 is a schematic diagram of displaying a management interface on a mobile phone according to at least one embodiment of this application.

In addition, when the Bluetooth connection is established between the mobile phone and the Bluetooth headset, the mobile phone may further use, as an authorized Bluetooth device, the Bluetooth headset connected in this case. For example, the mobile phone may locally store an identifier of the authorized Bluetooth device (for example, a MAC address of the Bluetooth headset) on the mobile phone. In this way, when the mobile phone subsequently receives an operation instruction or data (for example, a collected speech signal) sent by a Bluetooth device, the mobile phone may determine, based on the stored identifier of the authorized Bluetooth device, whether the Bluetooth device in communication in this case is an authorized Bluetooth device. When the mobile phone determines that an unauthorized Bluetooth device sends an operation instruction or data to the mobile phone, the mobile phone may discard the operation instruction or the data, to improve security in a use process of the mobile phone. Certainly, one mobile phone may manage one or more authorized Bluetooth devices. As shown in FIG. 6, the user may enter a management interface 601 of a device from a setting function of the mobile phone, and the user may add or delete a Bluetooth device on the management interface 601.

Figure 7:
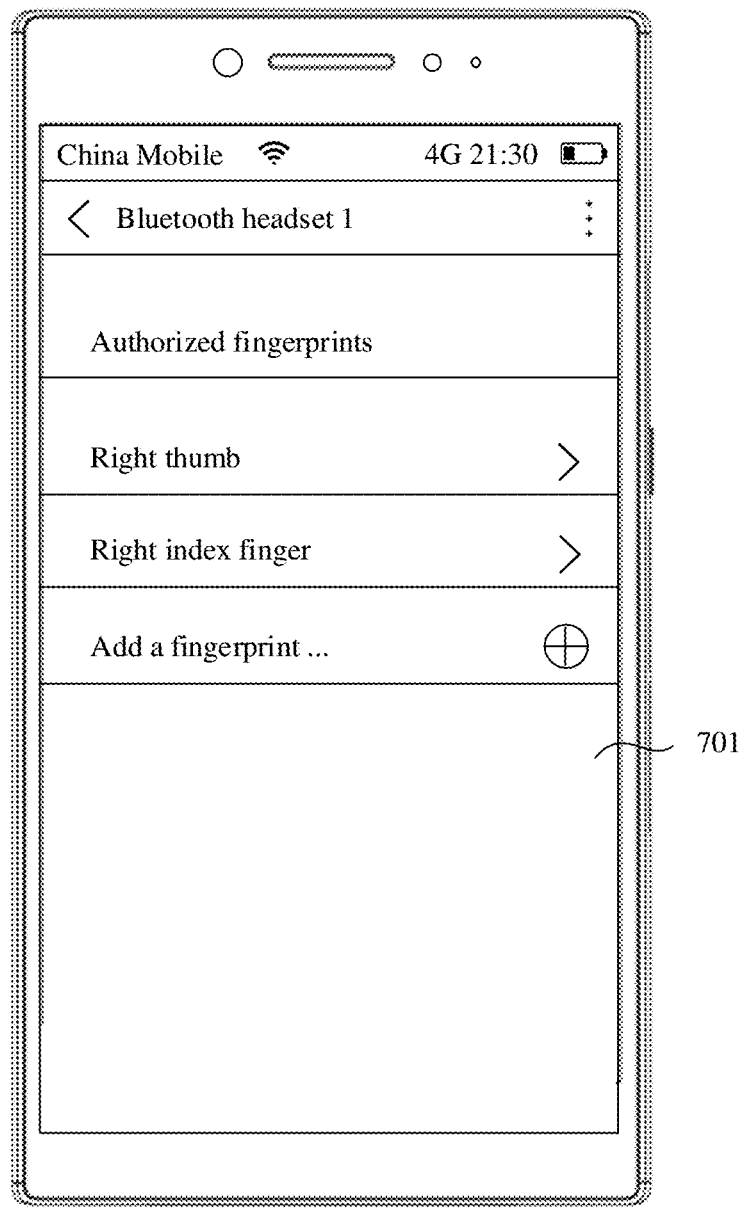
FIG. 7 is a schematic diagram of displaying a management interface of a Bluetooth headset on a mobile phone according to at least one embodiment of this application.

Further, for each authorized Bluetooth device, the user may further set one or more fingerprints supported by the authorized Bluetooth device. A Bluetooth headset 1 shown in FIG. 6 is used as an example. If it is detected that the user taps the Bluetooth headset 1 on the management interface 601, as shown in FIG. 7, the mobile phone may display a management interface 701 of the Bluetooth headset 1. On the management interface 701, the user may add one or more fingerprints as a fingerprint of the Bluetooth headset 1. The fingerprint may be entered by the user by using a fingerprint sensor on the mobile phone, or by using a fingerprint sensor on the Bluetooth headset 1. The fingerprint entered by the user may be stored in the mobile phone, or may be stored in the Bluetooth headset 1. This is not limited in at least one embodiment of this application. Subsequently, if a fingerprint collected by the Bluetooth headset 1 is the same as a fingerprint entered by the user in advance, the mobile phone (or the Bluetooth headset 1) may determine that a user operating the Bluetooth headset 1 in this case is an authorized user, in other words, authentication on a user identity succeeds.

After the Bluetooth connection is established between the mobile phone and the Bluetooth headset, if no operation of the user on the Bluetooth headset is detected within a preset time, the Bluetooth headset may also automatically enter a dormant state. In the dormant state, the Bluetooth headset may scan, at a relatively low working frequency, an electrical signal generated by each sensing unit in the fingerprint sensor, or the Bluetooth headset may temporarily disable the fingerprint sensor (for example, the fingerprint sensor is powered off). For example, the Bluetooth headset may enter a BLE (bluetooth low energy, Bluetooth low energy) mode. This reduces power consumption of the Bluetooth headset.

After entering the dormant state, the Bluetooth headset may reserve one or more sensors (for example, the foregoing acceleration sensor and the optical proximity sensor) to work at a specific frequency. The Bluetooth headset may use these sensors to detect whether the Bluetooth headset is currently in a wearing state. If the Bluetooth headset is in the wearing state, it indicates that the user has an operation intention of using the Bluetooth headset in this case. In this case, the Bluetooth headset may be switched from the dormant state to a working mode.

Figure 2:
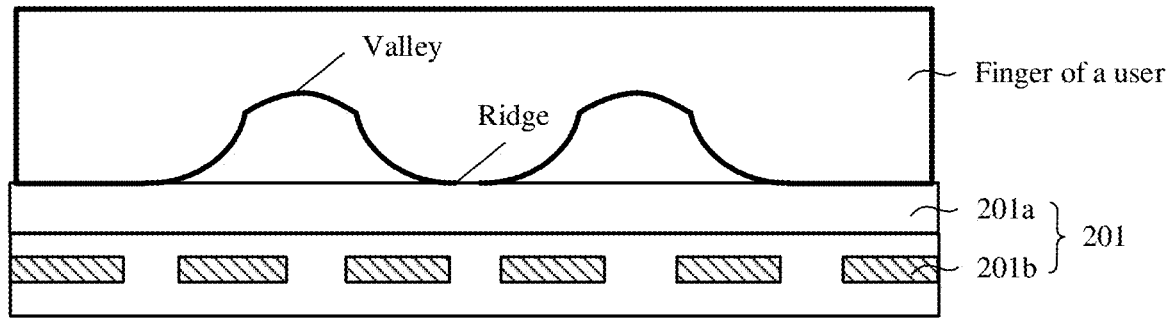
FIG. 2 is a schematic diagram of fingerprint collection of a fingerprint sensor according to at least one embodiment of this application.

For example, still as shown in FIG. 2, an optical proximity sensor 204 and an acceleration sensor may be disposed in the Bluetooth headset, and the optical proximity sensor 204 is disposed at a side that is in contact with the user when the user wears the Bluetooth headset. The optical proximity sensor 204 and the acceleration sensor may be periodically started to obtain a currently detected measurement value. To be specific, the Bluetooth headset may determine the wearing state of the Bluetooth headset by using the acceleration sensor. For example, when a measurement value detected by the acceleration sensor is greater than a preset acceleration threshold, it is determined that the Bluetooth headset is in the wearing state. The Bluetooth headset may further determine, by using the acceleration sensor, whether the user wearing the Bluetooth headset is talking. For example, when the measurement value detected by the acceleration sensor changes, it may be determined that the user wearing the Bluetooth headset is talking. Certainly, the Bluetooth headset may further implement an acceleration-related function by using the acceleration sensor. This is not limited in at least one embodiment of this application.

After the user wears the Bluetooth headset, light incident on the optical proximity sensor 204 is blocked. If light intensity detected by the optical proximity sensor 204 is less than a preset light intensity threshold, it may be considered that the Bluetooth headset is in the wearing state in this case. In addition, after the user wears the Bluetooth headset, the user is usually not in an absolute still state, and the acceleration sensor can sense a slight shake. Therefore, if an acceleration value detected by the acceleration sensor is greater than a preset acceleration threshold (for example, the acceleration threshold is 0), it may be determined that the Bluetooth headset is in the wearing state in this case.

Alternatively, when the light intensity detected by the optical proximity sensor 204 is less than the preset light intensity threshold, the acceleration sensor may be triggered to detect an acceleration value in this case. If the detected acceleration value is greater than the preset acceleration threshold, it may be determined that the Bluetooth headset is in the wearing state in this case. Alternatively, when the acceleration value detected by the acceleration sensor is greater than the preset acceleration threshold, the optical proximity sensor 204 may be triggered to detect light intensity of ambient light in this case. If the detected light intensity is less than the preset light intensity threshold, it may be determined that the Bluetooth headset is in the wearing state in this case.

It should be noted that, a sequence of a process of detecting whether the Bluetooth headset is currently in the wearing state and a process of establishing the Bluetooth connection between the Bluetooth headset and the mobile phone is not limited in at least one embodiment of this application. After establishing the Bluetooth connection to the mobile phone, the Bluetooth headset may determine, based on the measurement value of the optical proximity sensor 204 and the measurement value of the acceleration sensor, whether the Bluetooth headset is in the wearing state. Alternatively, after it is determined that the Bluetooth headset is currently in the wearing state, a Bluetooth function may be enabled to establish the Bluetooth connection to the mobile phone.

After switching from the dormant state to the working mode, the Bluetooth headset may start to scan, at a specific working frequency (for example, 10 Hz), an image formed after the user touches the fingerprint sensor, to collect the image formed on the fingerprint sensor. A fingerprint pattern of a finger of a common user is a pattern that includes valleys and ridges according to a specific rule. Therefore, the Bluetooth headset may learn a fingerprint feature of a common fingerprint in advance by using samples of some fingerprint patterns. The fingerprint feature may be stored in the Bluetooth headset in a form of a model or a vector. Certainly, the fingerprint feature may be alternatively obtained by the Bluetooth headset from another device (for example, the mobile phone or a cloud server). This is not limited in at least one embodiment of this application.

In this way, based on the fingerprint feature, the Bluetooth headset may determine, based on one or more images collected by the fingerprint sensor, whether a finger of the user touches the fingerprint sensor. If the finger of the user touches the fingerprint sensor, it indicates that the user wearing the Bluetooth headset in this case has an operation intention of using a speech recognition function, and the Bluetooth headset may enable a speech sensor of the Bluetooth headset to collect a speech signal generated when the user makes a sound.

For example, the Bluetooth headset may identify whether the image formed on the fingerprint sensor includes the fingerprint feature. When it is identified that the image includes the fingerprint feature, the Bluetooth headset may determine that the finger of the user touches the fingerprint sensor.

For another example, to prevent the user from accidentally touching the fingerprint sensor of the Bluetooth headset, the Bluetooth headset may count a quantity of images that consecutively include the fingerprint pattern in a plurality of images collected by the fingerprint sensor. If N (N is an integer greater than 1) consecutive images all include the fingerprint pattern that has the fingerprint feature, it indicates that the user wearing the Bluetooth headset has an intention of touching the fingerprint sensor, and the Bluetooth headset may determine that the finger of the user touches the fingerprint sensor, and therefore enable the speech sensor of the Bluetooth headset to collect the speech signal generated when the user makes a sound.

Figure 8:
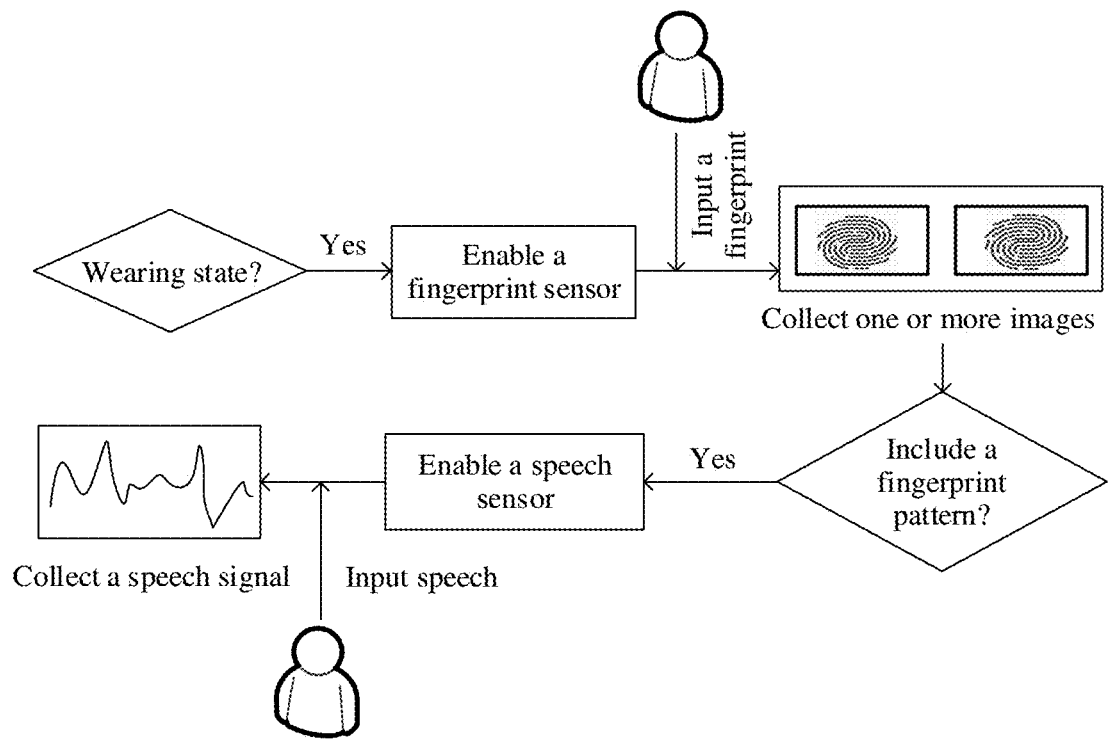
FIG. 8 is a schematic diagram of collecting a fingerprint and speech by a Bluetooth headset after a Bluetooth connection is established between the Bluetooth headset and a mobile phone according to at least one embodiment of this application.

For example, as shown in FIG. 8, after the user wears the Bluetooth headset and establishes the Bluetooth connection to the mobile phone, the Bluetooth headset may enable the fingerprint sensor of the Bluetooth headset, and collect one or more images formed on the fingerprint sensor. In this case, if the user wants to implement, by using the Bluetooth headset, various speech recognition functions provided by the mobile phone, such as control, by using speech, to unlock the mobile phone, make a call, or perform payment, the user may touch the fingerprint sensor on the Bluetooth headset by using the finger. The fingerprint sensor may send the collected one or more images to the Bluetooth headset, for example, to a computing module of the Bluetooth headset. The computing module identifies, based on the pre-stored fingerprint feature, whether the collected image includes the fingerprint pattern, in other words, whether the finger of the user touches the fingerprint sensor.

Still as shown in FIG. 8, when it is determined that the finger of the user touches the fingerprint sensor, the Bluetooth headset may enable the speech sensor (for example, an air conduction microphone) of the Bluetooth headset, and prompt the user to input a speech signal in a form such as vibration, speech, or light. In this case, the user may make a sound and input a speech signal such as "Unlock the mobile phone" or "Start the ** application (for example, start the chatting application)" to the Bluetooth headset. In this way, the speech sensor of the Bluetooth headset may convert a vibration signal generated when the user makes the sound into a speech signal in an electrical signal form.

The user may wake up the Bluetooth headset by inputting a fingerprint into the Bluetooth headset, and collect, by using the Bluetooth headset, the speech signal input by the user. The speech signal collected by the Bluetooth headset may be used for subsequent speech recognition. In addition, the fingerprint pattern collected by the Bluetooth headset may be used to subsequently perform authentication on the user identity. In this way, the mobile phone can subsequently implement the speech recognition function corresponding to the speech signal while the user does not need to interact with the mobile phone. To be specific, in a speech recognition scenario in which authentication needs to be performed on the user identity, the user needs to interact only with the Bluetooth headset to implement an identity authentication process and a speech recognition process. This reduces interaction complexity during speech recognition.

In addition, after the Bluetooth headset determines, based on the image collected by the fingerprint sensor, that the finger of the user touches the fingerprint sensor, it indicates that the user has an operation intention of using the speech recognition function in this case. After waking up the mobile phone, the Bluetooth headset may further enable a voice assistant APP in the mobile phone, so that a function related to speech recognition is subsequently completed by using the voice assistant APP.

It may be understood that the Bluetooth connection established between the Bluetooth headset and the mobile phone may be a security link.

When the security link is established between the Bluetooth headset and the mobile phone, the fingerprint sensor may be in a wakeup state, for example, the Bluetooth headset is in an always on state.

By using related steps in the foregoing at least one embodiment, the Bluetooth headset may collect, by using the fingerprint sensor, the image including the fingerprint pattern, and the Bluetooth headset may collect, by using the speech sensor, the speech signal input by the user. Therefore, based on the fingerprint pattern and the speech signal, a plurality of possible implementation solutions are provided in at least one embodiment of this application to complete a subsequent speech recognition process.

Solution 1

In the solution 1, a speech recognition algorithm used to recognize the speech signal may be pre-stored in the Bluetooth headset, and an authorized fingerprint of the Bluetooth headset is pre-stored in the mobile phone. In this case, after the Bluetooth headset collects the fingerprint and the speech signal that are input by the user, the mobile phone may perform authentication on the user identity based on the authorized fingerprint of the Bluetooth headset and the fingerprint that is input by the user. After the authentication succeeds, the Bluetooth headset may perform speech recognition on the speech signal input by the user.

Figure 9A:
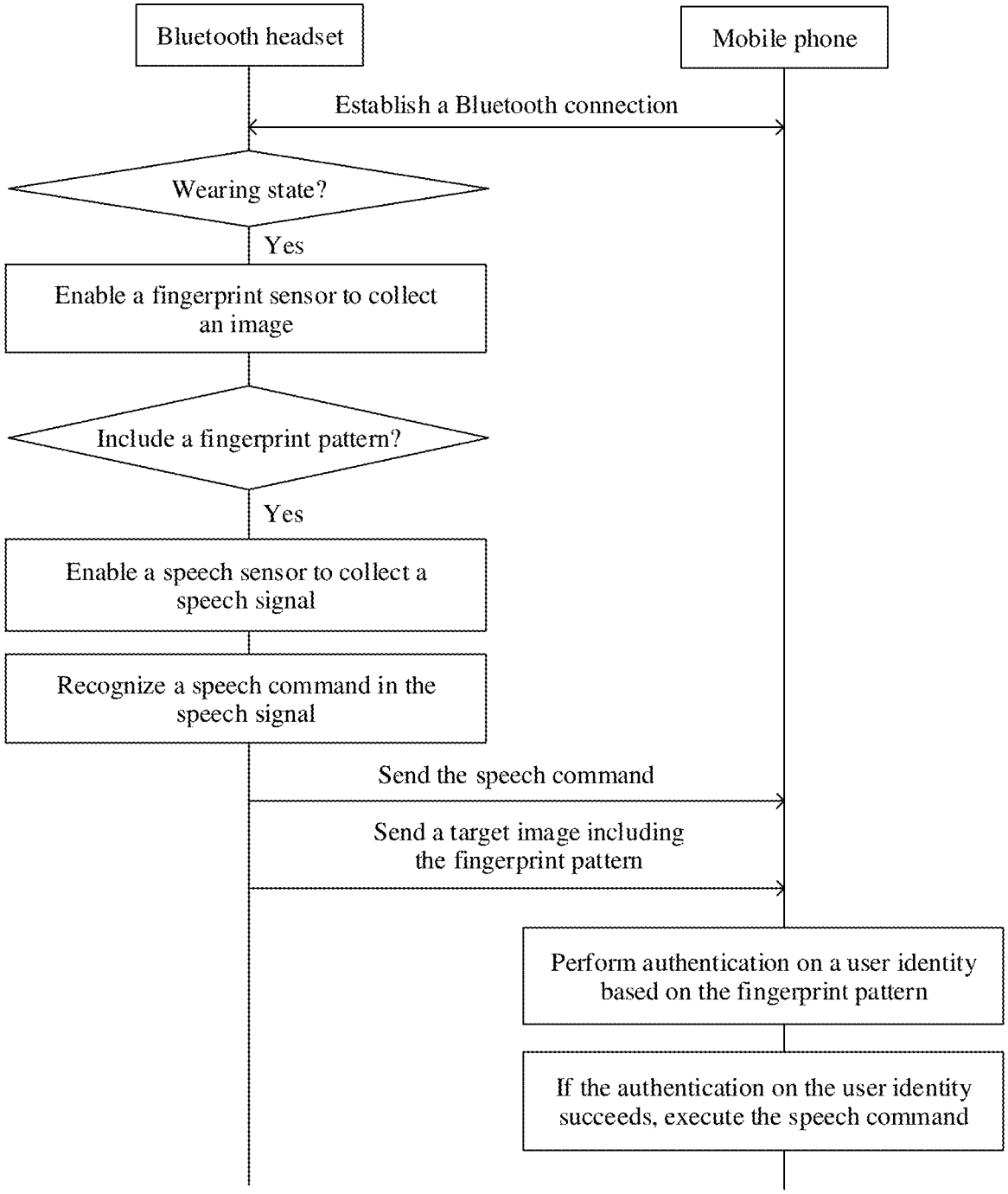
FIG. 9(a) and FIG. 9(b) are a schematic diagram of an interaction solution 1 between a mobile phone and a Bluetooth headset by using a fingerprint pattern and speech that are collected by the Bluetooth headset according to at least one embodiment of this application.

For example, as shown in FIG. 9(a), after the user wears the Bluetooth headset, the Bluetooth headset may collect, by using the fingerprint sensor, the image including the fingerprint pattern (which may be referred to as a target image in at least one embodiment of this application, and there may be one or more target images). The Bluetooth headset may collect, by using the speech sensor, the speech signal input by the user, for example, "Call Zhang San". Further, the Bluetooth headset may recognize a speech command in the speech signal by using the stored speech recognition algorithm. For example, a speech command corresponding to the speech signal "Call Zhang San" is "Call Zhang San in an address book". It may be understood that a person skilled in the art may set a specific speech recognition algorithm based on actual experience or an actual application scenario. This is not limited in at least one embodiment of this application.

The Bluetooth headset may send the recognized speech command to the mobile phone. The Bluetooth headset may further send the target image including the fingerprint pattern to the mobile phone. A sequence of sending the speech command to the mobile phone by the Bluetooth headset and sending the target image to the mobile phone by the Bluetooth headset is not limited in at least one embodiment of this application. For example, the Bluetooth headset may send the target image including the fingerprint pattern to the mobile phone, the mobile phone performs authentication, and after the authentication succeeds, the Bluetooth headset may send the recognized speech command to the mobile phone, and the mobile phone processes the speech command. For another example, the Bluetooth headset may send the recognized speech command to the mobile phone, and then send the target image including the fingerprint pattern to the mobile phone, the mobile phone performs authentication, and after the authentication succeeds, the mobile phone processes the speech command. For still another example, the Bluetooth headset may send the recognized speech command and the target image including the fingerprint pattern to the mobile phone, the mobile phone performs authentication, and after the authentication succeeds, the mobile phone processes the speech command.

Still as shown in FIG. 9(a), after receiving the target image sent by the Bluetooth headset, the mobile phone may perform, based on the fingerprint pattern in the target image, authentication on the user identity of the user wearing the Bluetooth headset in this case. For example, the mobile phone may compare the fingerprint pattern in the target image with one or more pre-stored authorized fingerprints. When a degree of overlapping between the fingerprint pattern in the target image and a specific authorized fingerprint is greater than a threshold, it indicates that the user wearing the Bluetooth headset in this case is an authorized user, in other words, the authentication on the user identity succeeds. If the authentication on the user identity fails, it indicates that the user inputting the speech signal to the Bluetooth headset in this case is an unauthorized user, and the mobile phone may discard data such as the target image and the speech command that are sent by the Bluetooth headset, to prevent the unauthorized user from hacking a mobile phone of the authorized user by using the speech recognition function.

In addition to receiving the target image sent by the Bluetooth headset, the mobile phone may further receive the speech command recognized by the Bluetooth headset. In this case, if the authentication on the user identity succeeds, it indicates that the user inputting the speech signal to the Bluetooth headset in this case is an authorized user, and the voice assistant APP in the mobile phone may execute the speech command to complete a current speech recognition process. For example, the speech command sent by the Bluetooth headset is "Call Zhang San in an address book". If the mobile phone determines that the user identity is an authorized user, the voice assistant APP in the mobile phone may invoke a corresponding interface to start an address book APP and automatically call the contact Zhang San in the address book APP.

In this way, when the mobile phone is in a speech recognition scenario in which authentication needs to be performed on the user identity, for example, a screen is locked, the user does not need to perform identity authentication on the mobile phone, but may complete a subsequent identity authentication process and speech recognition process by inputting the fingerprint and the speech signal on the Bluetooth headset. This reduces human-computer interaction complexity in the speech recognition scenario and improves operation efficiency of the speech recognition process.

In some embodiments of the solution 1, after recognizing the speech command in the speech signal, the Bluetooth headset may further determine whether authentication needs to be performed on the user identity when the mobile phone subsequently executes the speech command. If authentication needs to be performed on the user identity, the Bluetooth headset may send the collected target image to the mobile phone. Otherwise, the Bluetooth headset does not need to send the collected target image to the mobile phone.

For example, the Bluetooth headset may perform searching to determine whether the recognized speech command includes a preset keyword related to user privacy or money. For example, the preset keyword may be "unlock" or "pay". If the recognized speech command includes the preset keyword, it indicates that the mobile phone has a relatively high requirement for security when subsequently executing the speech command. In this case, the Bluetooth headset may send the collected target image including the fingerprint pattern to the mobile phone, and the mobile phone performs authentication on the user identity. Correspondingly, if the speech command recognized by the Bluetooth headset is a speech command that does not include the preset keyword, such as "Start the camera" or "Play music", it indicates that the mobile phone has a relatively low requirement for security when subsequently executing the speech command. In this case, the Bluetooth headset may send only the recognized speech command to the mobile phone, and the mobile phone may execute the speech command without a need to perform authentication on the user identity.

Alternatively, an application list may be pre-stored in the Bluetooth headset, and each application in the application list is an application for which authentication needs to be performed on the user identity when running. Therefore, after recognizing the speech command in the speech signal, the Bluetooth headset may further determine whether an application that executes the speech command is an application on the application list. If the application is an application on the application list, the Bluetooth headset may send the collected target image including the fingerprint pattern to the mobile phone, and the mobile phone performs authentication on the user identity. Otherwise, the Bluetooth headset may send only the recognized speech command to the mobile phone, and the mobile phone may execute the speech command without a need to perform authentication on the user identity.

Certainly, a person skilled in the art may further set another method based on an actual application scenario or actual experience to determine whether authentication needs to be performed on the user identity when the speech command is executed. This is not limited in at least one embodiment of this application.

Figure 9B:
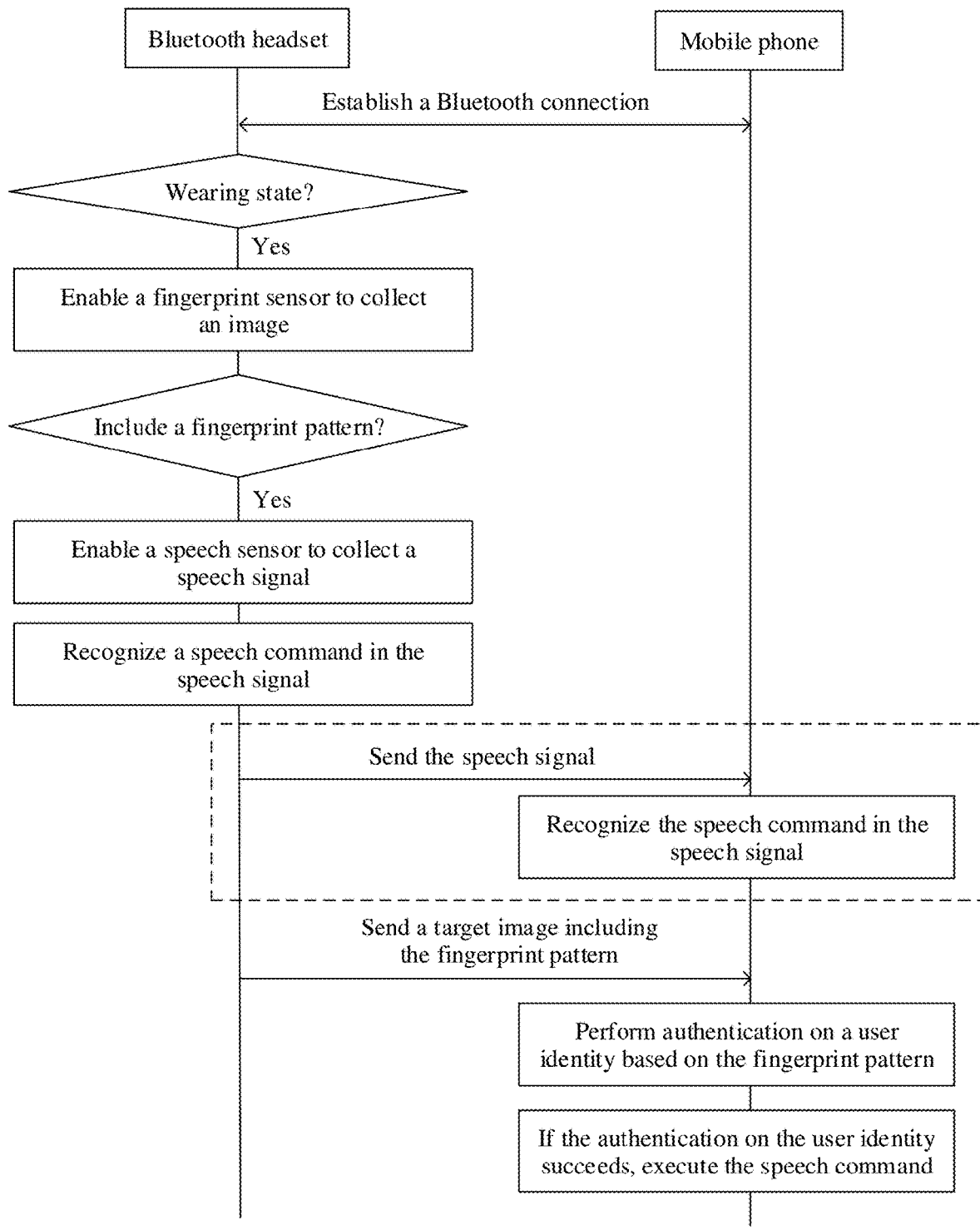

In some other embodiments of the solution 1, as shown in FIG. 9(b), different from the speech recognition process shown in FIG. 9(a), after the Bluetooth headset recognizes the speech command in the speech signal input by the user, the Bluetooth headset does not send the recognized speech command to the mobile phone, but send the speech signal collected by the Bluetooth headset. In this case, the mobile phone may perform speech recognition on the speech signal again by using the pre-stored speech recognition algorithm, to obtain the speech command in the speech signal. In this way, when the speech command recognized by the Bluetooth headset is consistent with the speech command recognized by the mobile phone, it indicates that accuracy of the current speech recognition process is relatively high, and the mobile phone may execute the speech command based on a result of the authentication on the user identity. Similar to the speech recognition process shown in FIG. 9(a) and FIG. 9(b), the Bluetooth headset may further send the target image including the fingerprint pattern to the mobile phone, so that the mobile phone can perform authentication on the user identity based on the target image. If the authentication on the user identity succeeds, it indicates that the user inputting the speech signal to the Bluetooth headset in this case is an authorized user, and the voice assistant APP may execute the speech command recognized by the mobile phone, to complete the current speech recognition process. It may be understood that the Bluetooth headset may also send, to the mobile phone, the speech signal input by the user, and the mobile phone recognizes the speech signal to obtain the speech command in the speech signal.

It may be understood that the Bluetooth headset may alternatively send the speech signal to the cloud server, the cloud server recognizes the speech command in the speech signal, the cloud server sends the speech command to the Bluetooth headset, the Bluetooth headset sends the speech command to the mobile phone, and the mobile phone executes a function corresponding to the speech command.

It may be understood that the cloud server may alternatively send the speech command in the recognized speech signal to the mobile phone, and the mobile phone executes the function corresponding to the speech command.

Alternatively, after recognizing the speech command in the speech signal input by the user, the Bluetooth headset may send, to the mobile phone, the speech command recognized by the Bluetooth headset, and may also send, to the mobile phone, the speech signal collected by the Bluetooth headset. After receiving the speech signal, the mobile phone may perform speech recognition on the speech signal to obtain the speech command recognized by the mobile phone. In this way, when the speech command recognized by the Bluetooth headset is consistent with the speech command recognized by the mobile phone, it indicates that accuracy of the current speech recognition process is relatively high, and the mobile phone may execute the speech command based on a result of the authentication on the user identity. If the speech command recognized by the Bluetooth headset is inconsistent with the speech command recognized by the mobile phone, it indicates that accuracy of the current speech recognition process is low, and the mobile phone may discard the speech command recognized by the Bluetooth headset and the speech command recognized by the mobile phone, and stop the current speech recognition process.

Solution 2

In the solution 2, a speech recognition algorithm used to recognize a speech signal may be pre-stored in the mobile phone, and an authorized fingerprint of the Bluetooth headset may be pre-stored in the Bluetooth headset. In this case, after collecting the fingerprint and the speech signal that are input by the user, the Bluetooth headset may perform authentication on the user identity based on the authorized fingerprint of the Bluetooth headset and the fingerprint input by the user, and the mobile phone performs, by using the speech recognition algorithm, speech recognition on the speech signal input by the user.

Figure 10:
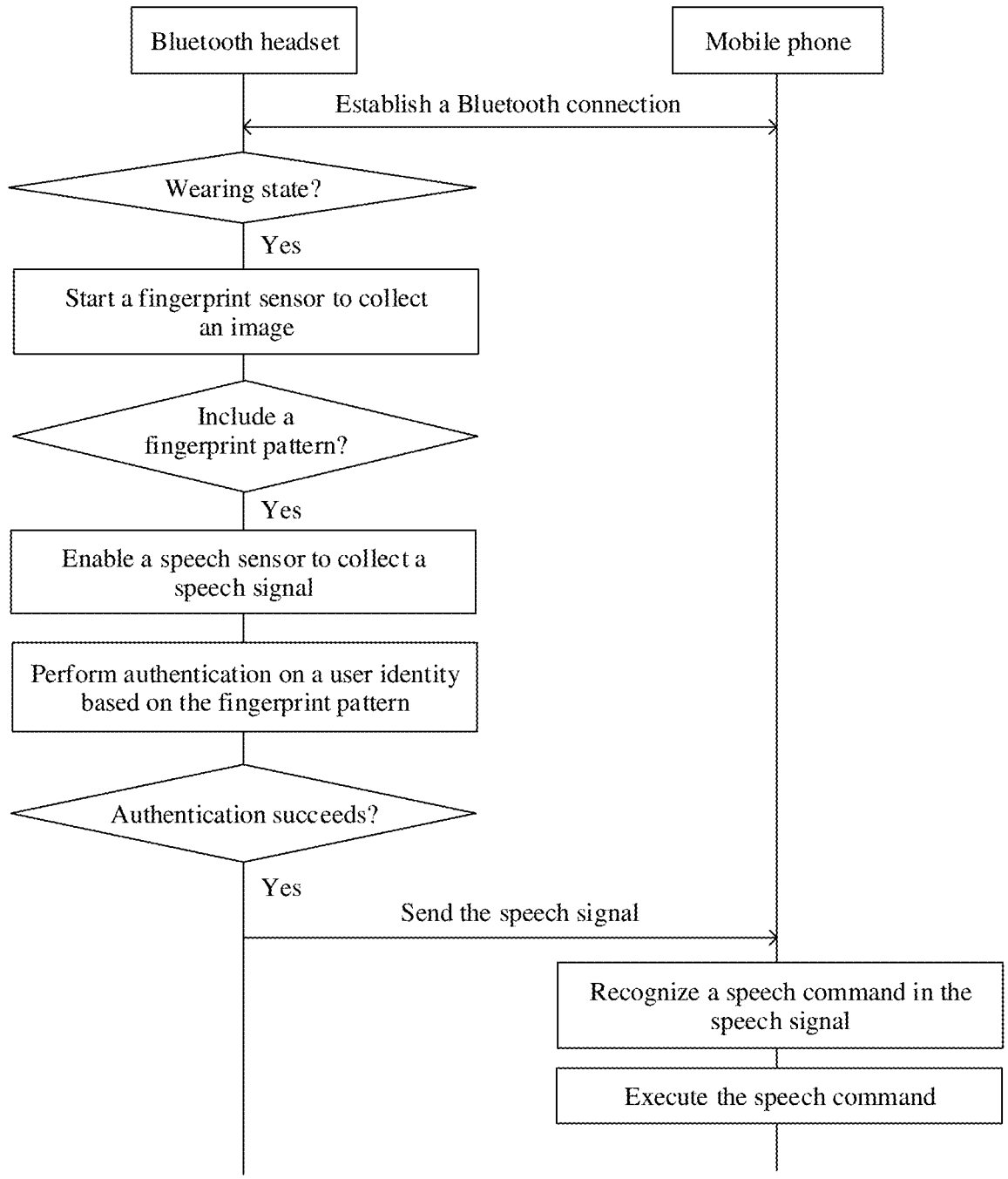
FIG. 10 is a schematic diagram of an interaction solution 2 between a mobile phone and a Bluetooth headset by using a fingerprint pattern and speech that are collected by the Bluetooth headset according to at least one embodiment of this application.

For example, as shown in FIG. 10, the Bluetooth headset may collect, by using the fingerprint sensor, a target image including the fingerprint pattern, and the Bluetooth headset may collect, by using the speech sensor, the speech signal input by the user, for example, "How is the weather today". In this way, the Bluetooth headset may perform authentication on the user identity based on the fingerprint pattern in the target image. For example, the Bluetooth headset may compare the fingerprint pattern in the target image with one or more pre-stored authorized fingerprints. When a degree of overlapping between the fingerprint pattern in the target image and a specific authorized fingerprint is greater than a threshold, it indicates that the user wearing the Bluetooth headset in this case is an authorized user, in other words, the authentication on the user identity succeeds. If the authentication on the user identity fails, it indicates that the user inputting the speech signal to the Bluetooth headset in this case is an unauthorized user, and the Bluetooth headset may discard data such as the collected target image and speech signal, to prevent the unauthorized user from hacking a mobile phone of the authorized user by using the speech recognition function.

If the authentication on the user identity succeeds, still as shown in FIG. 10, the Bluetooth headset may send the collected speech signal to the mobile phone, and the mobile phone recognizes the speech command in the speech signal by using the stored speech recognition algorithm. For example, it is recognized that a speech command in the speech signal "How is the weather today" is "Start the weather APP". Before sending the speech signal to the mobile phone, the Bluetooth headset has already determined that the identity of the current user is an authorized user. Therefore, after recognizing the speech command in the speech signal, the mobile phone may execute the speech command by using the voice assistant APP, to complete a current speech recognition process.

To be specific, after collecting the fingerprint of the user, the Bluetooth headset may first perform authentication on the user identity, and the Bluetooth headset sends the collected speech signal to the mobile phone for speech recognition only when the Bluetooth headset determines that the user in this case is an authorized user, to ensure security of speech recognition performed by using the Bluetooth headset. In a speech recognition scenario in which the mobile phone needs to perform authentication on the user identity, the user may only need to input the fingerprint on the Bluetooth headset to complete authentication. The Bluetooth headset may send the speech signal to the mobile phone, and the mobile phone processes the speech signal. This reduces human-computer interaction complexity in the speech recognition scenario.

Solution 3

In the solution 3, both an authorized fingerprint of the Bluetooth headset and a speech recognition algorithm that is used to recognize the speech signal may be pre-stored in the mobile phone. In this way, after collecting the fingerprint and the speech signal that are input by the user, the Bluetooth headset may send both the collected fingerprint and the collected speech signal to the mobile phone, and the mobile phone performs authentication on the user identity based on the fingerprint input by the user, and the mobile phone performs speech recognition on the speech signal input by the user.

Figure 11:
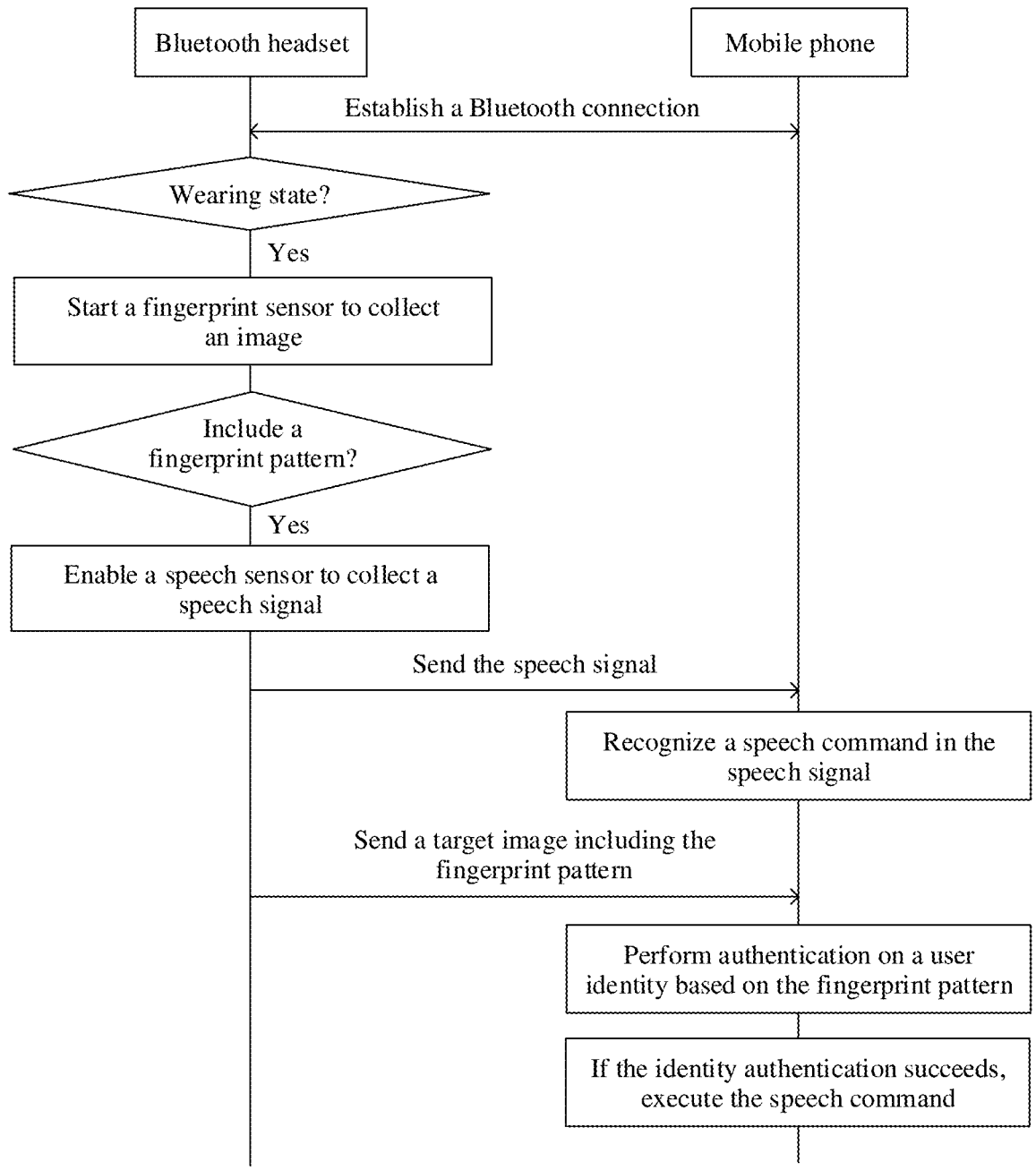
FIG. 11 is a schematic diagram of an interaction solution 3 between a mobile phone and a Bluetooth headset by using a fingerprint pattern and speech that are collected by the Bluetooth headset according to at least one embodiment of this application.

For example, as shown in FIG. 11, the Bluetooth headset may collect, by using the fingerprint sensor, a target image including the fingerprint pattern, and the Bluetooth headset may collect, by using the speech sensor, the speech signal input by the user, for example, "Start Alipay". In this way, the Bluetooth headset may send both the collected speech signal and the target image to the mobile phone.

Still as shown in FIG. 11, after receiving the target image sent by the Bluetooth headset, the mobile phone may perform, based on the fingerprint pattern in the target image, authentication on the user identity of the user wearing the Bluetooth headset in this case. In addition, after receiving the speech signal sent by the Bluetooth headset, the mobile phone may perform speech recognition on the speech signal by using the speech recognition algorithm, to recognize a speech command in the speech signal. For example, it is recognized that a speech command in the speech signal "Start Alipay" is "Start the Alipay APP".

In this case, if the authentication on the user identity succeeds, it indicates that the user inputting the speech signal to the Bluetooth headset in this case is an authorized user, and the voice assistant APP in the mobile phone may execute the speech command to complete a current speech recognition process. If the authentication on the user identity fails, it indicates that the user inputting the speech signal to the Bluetooth headset in this case is an unauthorized user, and the mobile phone may discard data such as the target image and the speech signal that are sent by the Bluetooth headset and the speech command recognized by the mobile phone, to prevent the unauthorized user from hacking a mobile phone of the authorized user by using the speech recognition function.

It should be noted that an execution sequence between the step of performing authentication on the user identity by the mobile phone and the step of performing speech recognition on the speech signal by the mobile phone is not limited in at least one embodiment of this application. For example, the mobile phone may simultaneously perform the two steps, or may first perform authentication on the user identity, and then determine, based on an authentication result, whether to perform speech recognition on the speech signal. This is not limited in at least one embodiment of this application.

Alternatively, the mobile phone may first perform speech recognition on the speech signal sent by the Bluetooth headset, to obtain a speech command in the speech signal. In this way, the mobile phone may further determine whether authentication needs to be performed on the user identity when the speech command is executed. For example, when the recognized speech command relates to the Alipay APP, the mobile phone may determine that authentication needs to be performed on the user identity when the speech command is executed. In this way, the mobile phone may perform authentication on the user identity based on the target image sent by the Bluetooth headset, and execute the recognized speech command if the authentication succeeds. Correspondingly, if authentication does not need to be performed on the user identity when the speech command is executed, the mobile phone does not need to perform authentication on the user identity, but executes the recognized speech command.

It may be learned that in the solution 3, the Bluetooth headset only needs to collect the fingerprint and the speech signal that are input by the user, and both a user identity authentication process and a speech recognition process may be completed by the mobile phone. This greatly reduces implementation complexity of the Bluetooth headset, reduces human-computer interaction complexity in a speech recognition scenario, and improves operation efficiency of the speech recognition process.

Solution 4

In the solution 4, both an authorized fingerprint of the Bluetooth headset and a speech recognition algorithm that is used to recognize the speech signal may be pre-stored in the Bluetooth headset. In this way, after collecting the fingerprint and the speech signal that are input by the user, the Bluetooth headset may perform authentication on the user identity based on the fingerprint input by the user, and perform speech recognition on the speech signal input by the user.

For example, as shown in FIG. 12(*a*), the Bluetooth headset may collect, by using the fingerprint sensor, a target image including the fingerprint pattern, and the Bluetooth headset may collect, by using the speech sensor, the speech signal input by the user, for example, "Navigate home". In this case, based on the target image collected by the Bluetooth headset, the Bluetooth headset may perform, based on the fingerprint pattern in the target image, the user identity of the user wearing the Bluetooth headset in this case. Based on the speech signal collected by the Bluetooth headset, the Bluetooth headset may perform speech recognition on the speech signal by using the speech recognition algorithm, to recognize a speech command in the speech signal.

Figure 12A:
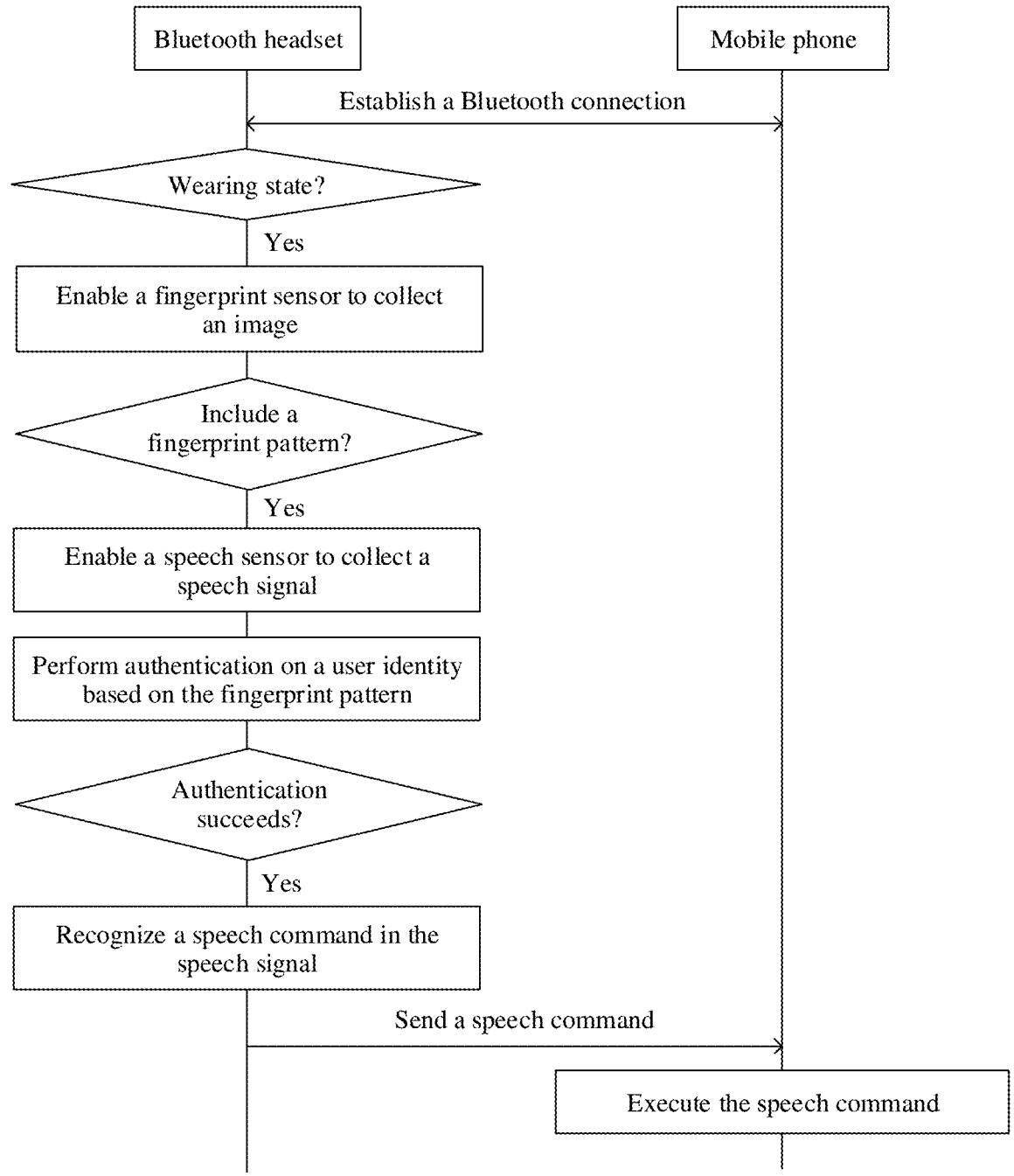
FIG. 12(a) and FIG. 12(b) are a schematic diagram of an interaction solution 4 between a mobile phone and a Bluetooth headset by using a fingerprint pattern and speech that are collected by the Bluetooth headset according to at least one embodiment of this application.

Therefore, if the authentication on the user identity succeeds, it indicates that the user inputting the speech signal to the Bluetooth headset in this case is an authorized user. Still as shown in FIG. 12(a), the Bluetooth headset may send the recognized speech command to the mobile phone, and the voice assistant APP in the mobile phone executes the speech command to complete a current speech recognition process. If the authentication on the user identity fails, it indicates that the user inputting the speech signal to the Bluetooth headset in this case is an unauthorized user, and the Bluetooth headset may discard data such as the target image and the speech signal that are collected by the Bluetooth headset and the recognized speech command, to prevent the unauthorized user from hacking a mobile phone of the authorized user by using the speech recognition function.

Figure 12B:
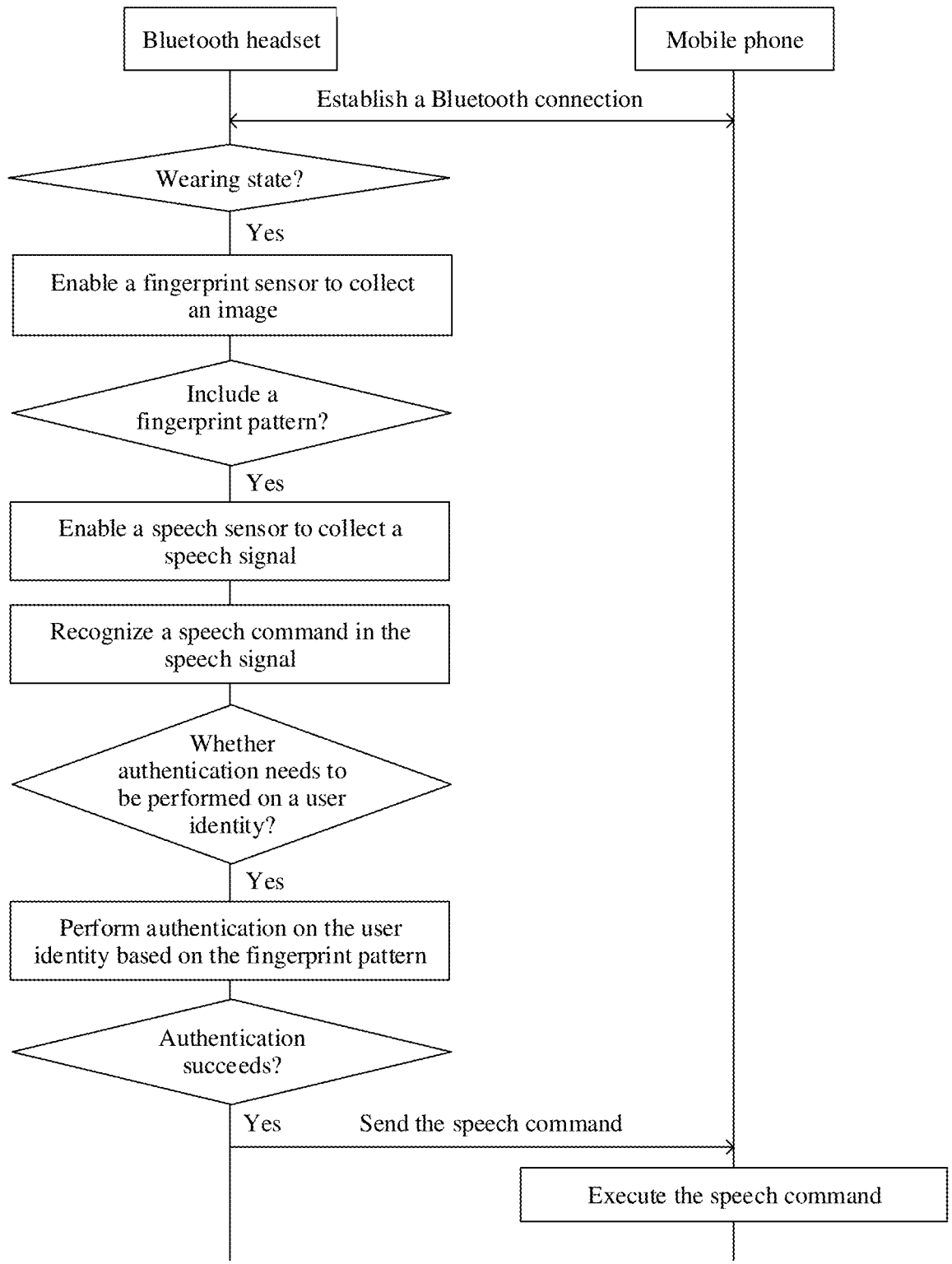

In a possible implementation, as shown in FIG. 12(b), after the Bluetooth headset collects a target image including the fingerprint pattern and the speech signal that is input by the user, the Bluetooth headset may first recognize a speech command in the speech signal by using the speech recognition algorithm. For example, it is recognized that a speech command in a speech signal "Navigate home" is "Plan a navigation route home in the map APP". In this case, the Bluetooth headset may further determine whether authentication needs to be performed on the user identity when the mobile phone executes the speech command. For example, when the recognized speech command relates to a home address of the user, it may be determined that authentication needs to be performed on the user identity when the speech command is executed. In this way, the Bluetooth headset may perform authentication on the user identity based on the collected target image. If the identity authentication succeeds, the Bluetooth headset may send the recognized speech command to the mobile phone, and the mobile phone executes the speech command. Correspondingly, if authentication does not need to be performed on the user identity when the speech command is executed, the Bluetooth headset does not need to perform authentication on the user identity, and may send the recognized speech command to the mobile phone, and the mobile phone executes the speech command.

In another possible implementation, different from the speech recognition processes shown in FIG. 12(a) and FIG. 12(b), after the Bluetooth headset recognizes the speech command in the speech signal, the Bluetooth headset does not send the recognized speech command to the mobile phone, but send the speech signal collected by the Bluetooth headset. In this case, the mobile phone may perform speech recognition on the speech signal again by using the pre-stored speech recognition algorithm, to obtain the speech command in the speech signal. In this way, when the speech command recognized by the Bluetooth headset is consistent with the speech command recognized by the mobile phone, it indicates that accuracy of a current speech recognition process is relatively high. Before sending the speech signal to the mobile phone, the Bluetooth headset has already determined that the identity of the current user is an authorized user. Therefore, after recognizing the speech command in the speech signal, the mobile phone may execute the speech command by using the voice assistant APP, to complete the current speech recognition process.

In the speech recognition methods provided in the foregoing solutions 1 to 4, the user may wake up the Bluetooth headset by inputting the fingerprint to the Bluetooth headset, and collect, by using the Bluetooth headset, the speech signal generated when the user makes a sound, to complete the user identity authentication process and the speech recognition process between the Bluetooth headset and the mobile phone. In the entire speech recognition process, the user may input the fingerprint and the speech signal on the worn Bluetooth headset, to reduce interaction complexity in the speech recognition scenario. In addition, in the speech recognition scenario in which authentication needs to be performed on the user identity, authentication may be performed on the user identity based on the fingerprint input by the user on the Bluetooth headset. This ensures security of the speech recognition process.

The authentication process may be performed by the Bluetooth headset, or may be performed by the mobile phone. Alternatively, the Bluetooth headset may send the collected fingerprint image to the cloud server, the cloud server completes authentication, the cloud server returns an authentication result to the Bluetooth headset, and then the Bluetooth headset sends the authentication result to the mobile phone. Alternatively, when the cloud server completes authentication, the cloud server may send the authentication result to the mobile phone.

In some other embodiments of this application, in addition to enabling the user to wake up the Bluetooth headset by using the fingerprint to collect the speech signal input by the user, the Bluetooth headset may be triggered, by using preset a wake-up phrase, to collect the speech signal input by the user. The preset wake-up phrase may be "Hello, E", "Hi, Google", or the like. This is not limited in at least one embodiment of this application.

Figure 13:
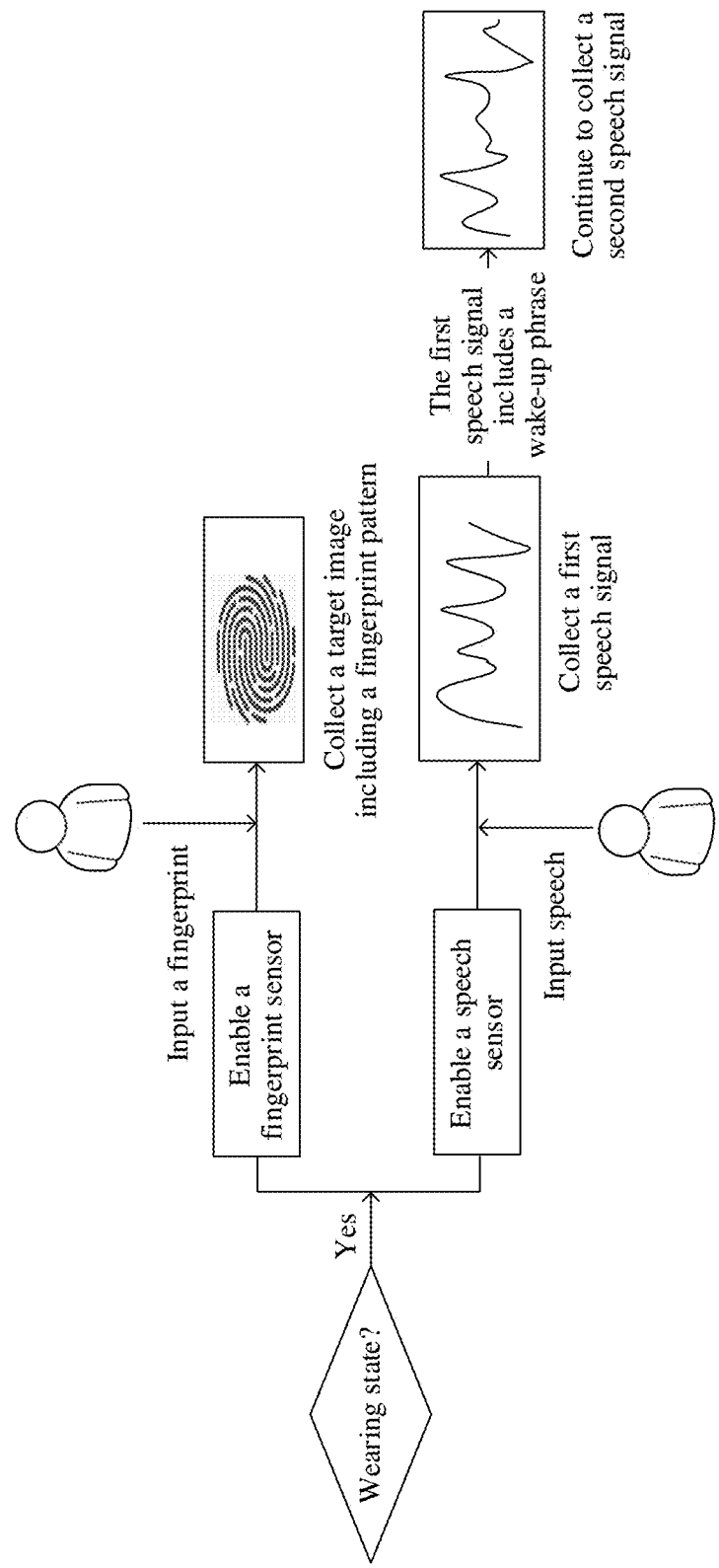
FIG. 13 is a schematic diagram of speech collection of a Bluetooth headset according to at least one embodiment of this application.

For example, as shown in FIG. 13, when it is detected that the Bluetooth headset is currently in the wearing state, the Bluetooth headset may enable the speech sensor and collect, at a first working frequency, a speech signal (namely, a first speech signal) input by the user. In addition, the Bluetooth headset may identify whether the collected first speech signal includes the preset wake-up phrase. When it is identified that the first speech signal includes the preset wake-up phrase, the Bluetooth headset may continue to collect, at a relatively high second working frequency (the second working frequency may be greater than the first working frequency), a speech signal (namely, a second speech signal) input by the user.

Still as shown in FIG. 13, when the Bluetooth headset detects that the Bluetooth headset is currently in the wearing state, the Bluetooth headset may further enable the fingerprint sensor of the Bluetooth headset, and collect one or more images formed on the fingerprint sensor. After collecting a target image including the fingerprint pattern, the Bluetooth headset may stop collecting the image formed on the fingerprint sensor. Subsequently, the fingerprint pattern in the target image may be used as a basis for performing authentication the user identity in a current process of using the Bluetooth headset. For example, when detecting that the user is wearing the Bluetooth headset, the user may be prompted, in a form of vibration, speech, light, or the like, to input the fingerprint on the fingerprint sensor. In addition, when it is detected that the user removes the Bluetooth headset, the Bluetooth headset may be triggered to delete the target image collected by the fingerprint sensor this time. In each process of using the Bluetooth headset, a fingerprint pattern of a user wearing the Bluetooth headset this time may be stored in the Bluetooth headset.

Similar to the speech recognition methods provided in the foregoing solutions 1 to 4, after the Bluetooth headset obtains the fingerprint pattern and the second speech signal that are of the user wearing the Bluetooth headset in a current use process, a plurality of possible implementation solutions are provided in at least one embodiment of this application to complete a subsequent speech recognition process.

Solution 5

Figure 14:
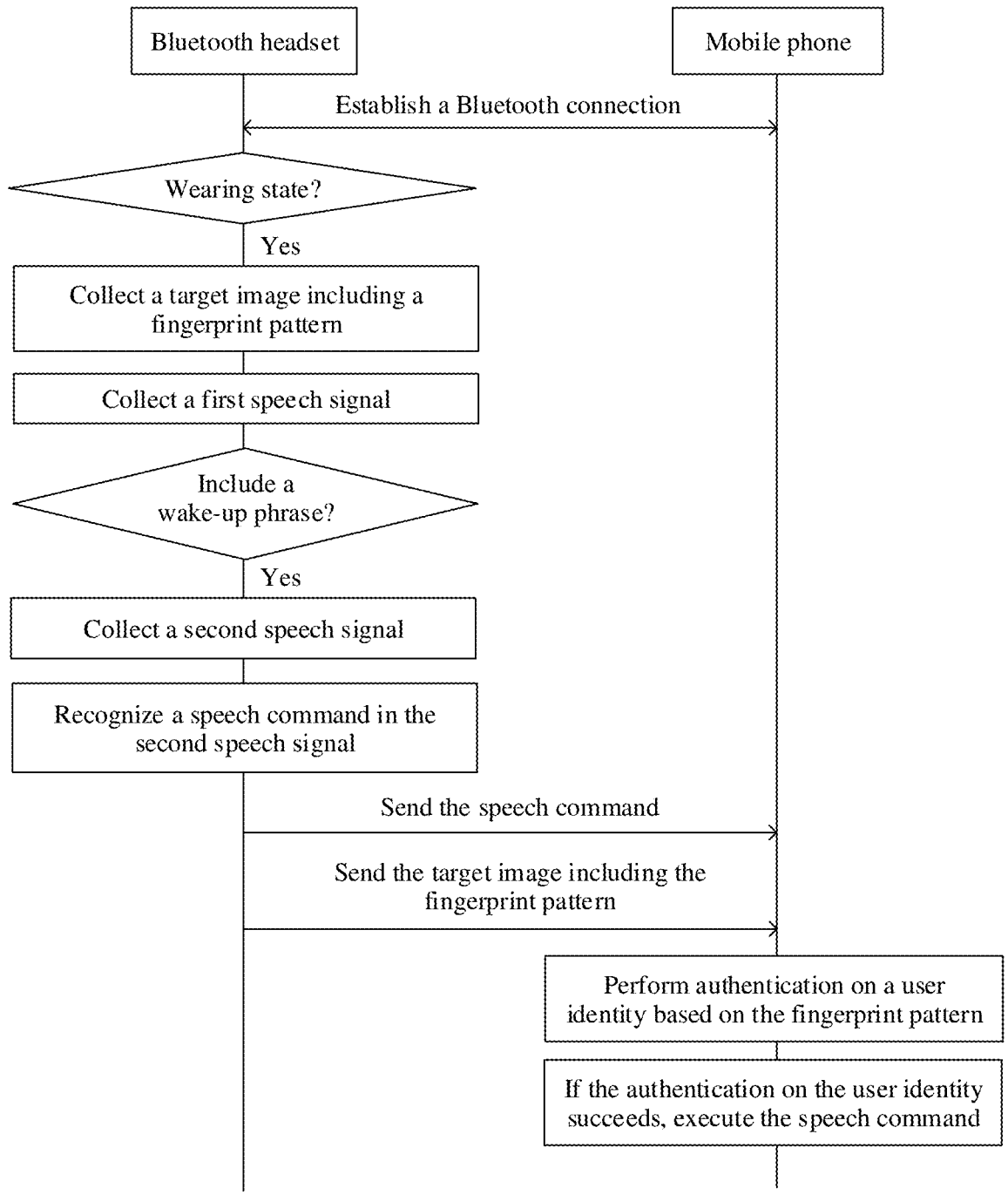
FIG. 14 is a schematic diagram of an interaction solution 5 between a mobile phone and a Bluetooth headset by using a fingerprint pattern and speech that are collected by the Bluetooth headset according to at least one embodiment of this application.

In the solution 5, as shown in FIG. 14, after the user wears the Bluetooth headset, the fingerprint sensor of the Bluetooth headset may collect the target image that includes the fingerprint pattern and that is input by the user. The Bluetooth headset may enable the speech sensor to collect the first speech signal input by the user. When it is detected that the first speech signal includes the preset wake-up phrase, the Bluetooth headset may continue to collect, by using the speech sensor, the second speech signal input by the user.

Similar to the solution 1, a speech recognition algorithm used to recognize the second speech signal may be pre-stored in the Bluetooth headset, and an authorized fingerprint of the Bluetooth headset may be pre-stored in the mobile phone. In this case, still as shown in FIG. 14, the Bluetooth headset may recognize a speech command in the second speech signal by using the stored speech recognition algorithm. In this way, the Bluetooth headset may send the recognized speech command to the mobile phone. In addition, the Bluetooth headset may further send the target image including the fingerprint pattern to the mobile phone.

Still as shown in FIG. 14, after receiving the target image sent by the Bluetooth headset, the mobile phone may perform, based on the fingerprint pattern in the target image, authentication on the user identity of the user wearing the Bluetooth headset in this case. If the authentication on the user identity succeeds, it indicates that the user inputting the second speech signal to the Bluetooth headset in this case is an authorized user, and the voice assistant APP in the mobile phone may execute the speech command sent by the Bluetooth headset, to complete a current speech recognition process. If the authentication on the user identity fails, it indicates that the user inputting the second speech signal to the Bluetooth headset is an unauthorized user, and the mobile phone may discard data such as the target image and the speech command that are sent by the Bluetooth headset, to prevent the unauthorized user from hacking a mobile phone of the authorized user by using the speech recognition function.

For example, after recognizing the speech command in the second speech signal, the Bluetooth headset may further determine whether authentication needs to be performed on the user identity when the mobile phone subsequently executes the speech command. If authentication needs to be performed on the user identity, the Bluetooth headset may send the collected target image to the mobile phone, and the mobile phone performs authentication on the user identity. Otherwise, the Bluetooth headset does not need to send the collected target image to the mobile phone, and the mobile phone may still execute the speech command in the second speech signal.

It should be noted that, in the solution 1, the mobile phone performs authentication on the user identity. Therefore, each time the user wears the Bluetooth phone, the Bluetooth headset may send the collected target image to the mobile phone in advance. In this way, after collecting the second speech signal, the Bluetooth headset may not need to send the target image to the mobile phone again.

Alternatively, similar to the solution 1, after recognizing the speech command in the second speech signal input by the user, the Bluetooth headset may send the collected second speech signal to the mobile phone instead of sending the speech command recognized by the Bluetooth headset to the mobile phone. In this case, the mobile phone may perform speech recognition on the second speech signal again by using the pre-stored speech recognition algorithm, to obtain the speech command in the second speech signal. Details are not described again in at least one embodiment of this application.

Solution 6

Figure 15A:
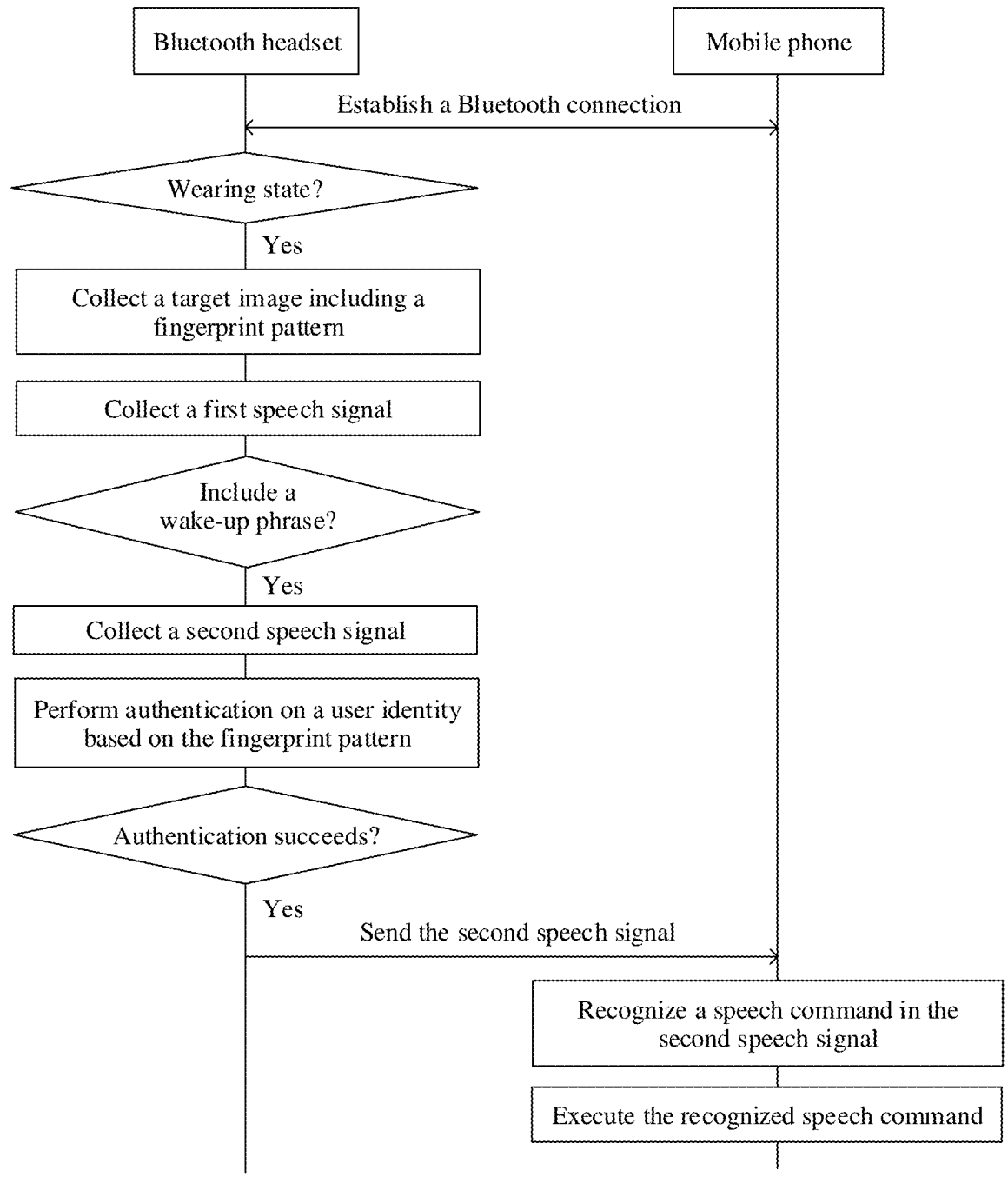
FIG. 15(a) and FIG. 15(b) are a schematic diagram of an interaction solution 6 between a mobile phone and a Bluetooth headset by using a fingerprint pattern and speech that are collected by the Bluetooth headset according to at least one embodiment of this application.
Figure 15B:
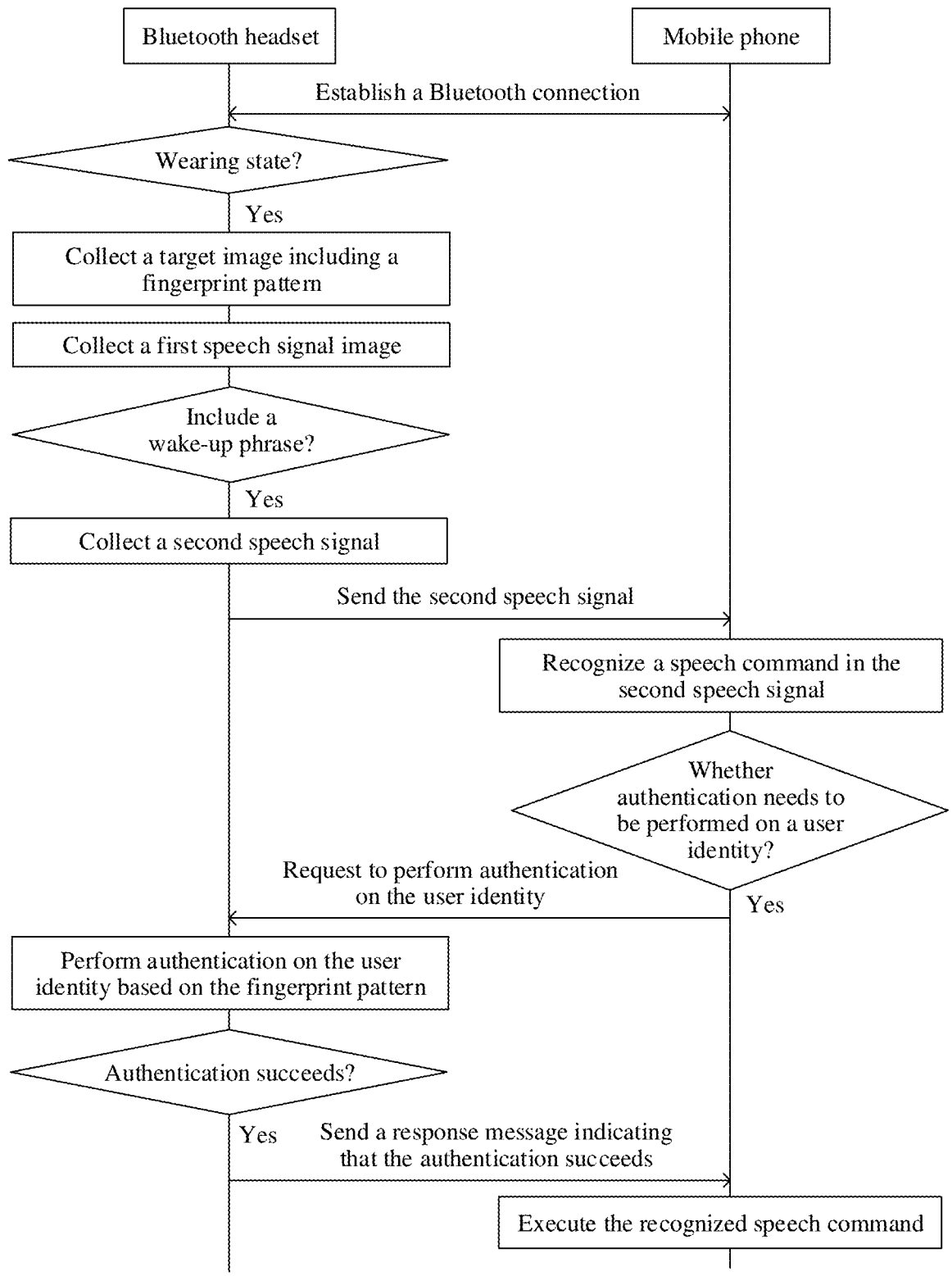

In the solution 6, as shown in FIG. 15(*a*) and FIG. 15(*b*), after the user wears the Bluetooth headset, the Bluetooth headset may collect, on the fingerprint sensor, the target image that includes the fingerprint pattern and that is input by the user. The Bluetooth headset may enable the speech sensor and collect the first speech signal input by the user. When it is detected that the first speech signal includes the preset wake-up phrase, the Bluetooth headset may continue to collect, by using the speech sensor, the second speech signal input by the user.

Similar to the solution 2, a speech recognition algorithm used to recognize the second speech signal may be pre-stored in the mobile phone, and an authorized fingerprint of the Bluetooth headset may be pre-stored in the Bluetooth headset. In this case, as shown in FIG. 15(*a*), the Bluetooth headset may perform authentication on the user identity based on the fingerprint pattern in the target image. If the authentication on the user identity succeeds, the Bluetooth headset may send the collected second speech signal to the mobile phone, and the mobile phone recognizes a speech command in the second speech signal by using the stored speech recognition algorithm, and executes the speech command.

Alternatively, as shown in FIG. 15(*b*), after collecting the second speech signal, the Bluetooth headset may first send the second speech signal to the mobile phone, and the mobile phone recognizes a speech command in the second speech signal by using the speech recognition algorithm. In this way, the mobile phone may further determine whether authentication needs to be performed on the user identity when the speech command is executed. If authentication needs to be performed on the user identity, the mobile phone may indicate the Bluetooth headset to perform authentication on the user identity based on the collected target image. After the authentication on the user identity succeeds, the Bluetooth headset may send a response message indicating that the authentication succeeds to the mobile phone. In this way, after receiving the response message indicating that the authentication succeeds, the mobile phone may execute the speech command recognized from the second speech signal. Certainly, if authentication does not need to be performed on the user identity when the speech command is executed, the mobile phone may execute the speech command recognized from the second speech signal.

Correspondingly, if the authentication on the user identity fails, it indicates that the user inputting the second speech signal to the Bluetooth headset is an unauthorized user, and the Bluetooth headset may send a response message indicating that the authentication fails to the mobile phone. After receiving the response message indicating that the authentication fails, the mobile phone may discard data such as the received second speech signal and the recognized speech command, to prevent the unauthorized user from hacking a mobile phone of an authorized user by using the speech recognition function.

Solution 7

Figure 16:
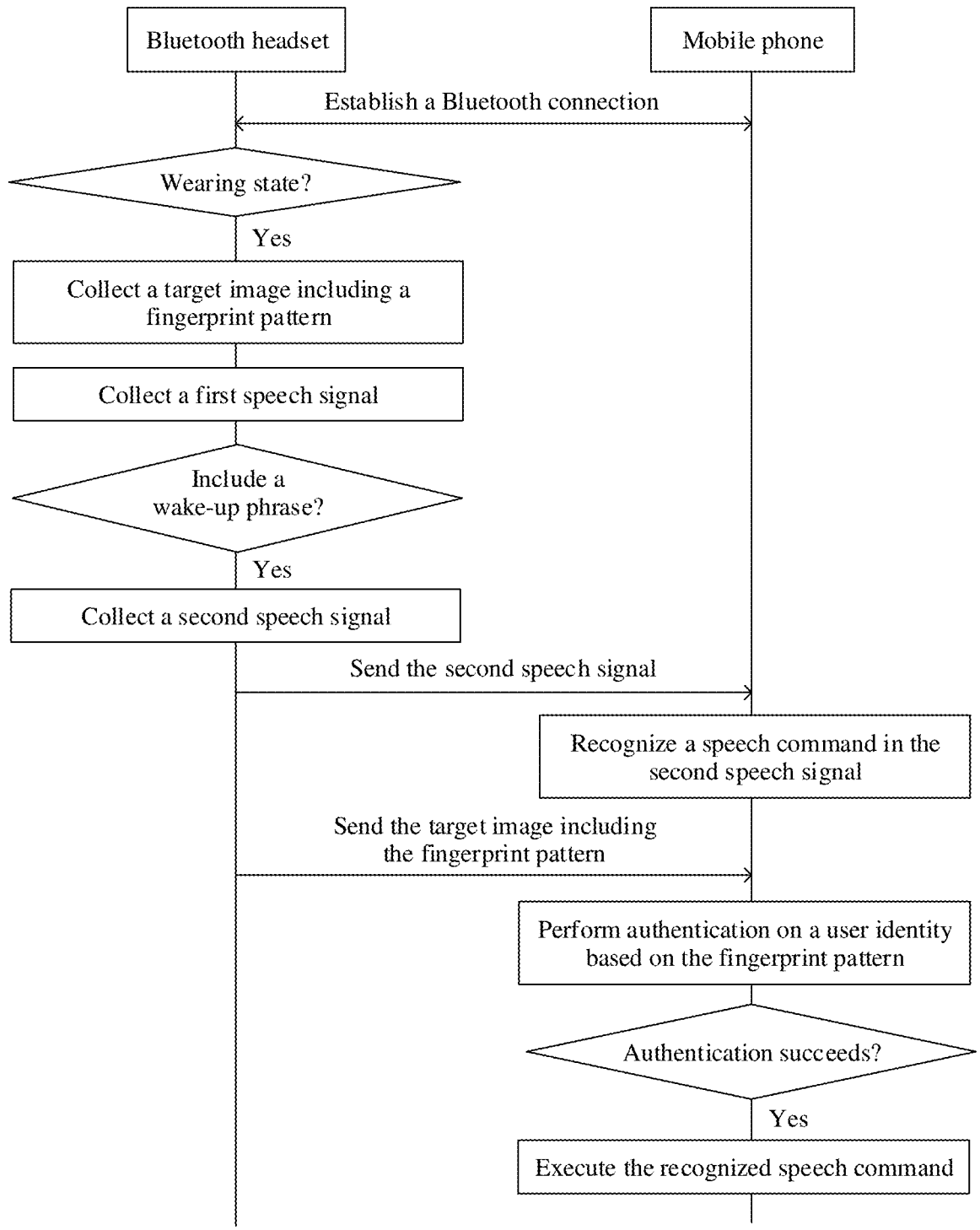
FIG. 16 is a schematic diagram of an interaction solution 7 between a mobile phone and a Bluetooth headset by using a fingerprint pattern and speech that are collected by the Bluetooth headset according to at least one embodiment of this application.

In the solution 7, as shown in FIG. 16, after the user wears the Bluetooth headset, the Bluetooth headset may collect, on the fingerprint sensor, the target image that includes the fingerprint pattern and that is input by the user. In addition, the Bluetooth headset may enable the speech sensor and collect the first speech signal input by the user. When it is detected that the first speech signal includes the preset wake-up phrase, the Bluetooth headset may continue to collect the second speech signal input by the user.

Similar to the solution 3, an authorized fingerprint of the Bluetooth headset and a speech recognition algorithm that is used to recognize the second speech signal may be pre-stored in the mobile phone. In this case, still as shown in FIG. 16, the Bluetooth headset may send both the collected target image and the collected second speech signal to the mobile phone. After receiving the target image sent by the Bluetooth headset, the mobile phone may perform, based on the fingerprint pattern in the target image, authentication on the user identity of the user wearing the Bluetooth headset in this case. After receiving the second speech signal sent by the Bluetooth headset, the mobile phone may perform speech recognition on the second speech signal by using the speech recognition algorithm, to recognize a speech command in the second speech signal.

In this case, if the authentication on the user identity succeeds, it indicates that the user inputting the second speech signal to the Bluetooth headset in this case is an authorized user, and the voice assistant APP in the mobile phone may execute the speech command to complete a current speech recognition process. If the authentication on the user identity fails, it indicates that the user inputting the second speech signal to the Bluetooth headset in this case is an unauthorized user, and the mobile phone may discard data such as the target image and the speech signal that are sent by the Bluetooth headset and the speech command recognized by the mobile phone, to prevent the unauthorized user from hacking a mobile phone of the authorized user by using the speech recognition function.

For example, after receiving the second speech signal sent by the Bluetooth headset, the mobile phone may first perform speech recognition on the second speech signal to obtain the speech command in the second speech signal. In this way, the mobile phone may further determine whether authentication needs to be performed on the user identity when the speech command is executed. If authentication needs to be performed on the user identity, the mobile phone may further obtain the target image collected by the Bluetooth headset, to perform authentication on the user identity based on the target image. If the identity authentication succeeds, the mobile phone executes the recognized speech command. Correspondingly, if authentication does not need to be performed on the user identity when the speech command is executed, the mobile phone does not need to perform authentication on the user identity after obtaining the target image collected by the Bluetooth headset, but executes the recognized speech command.

Solution 8

Figure 17:
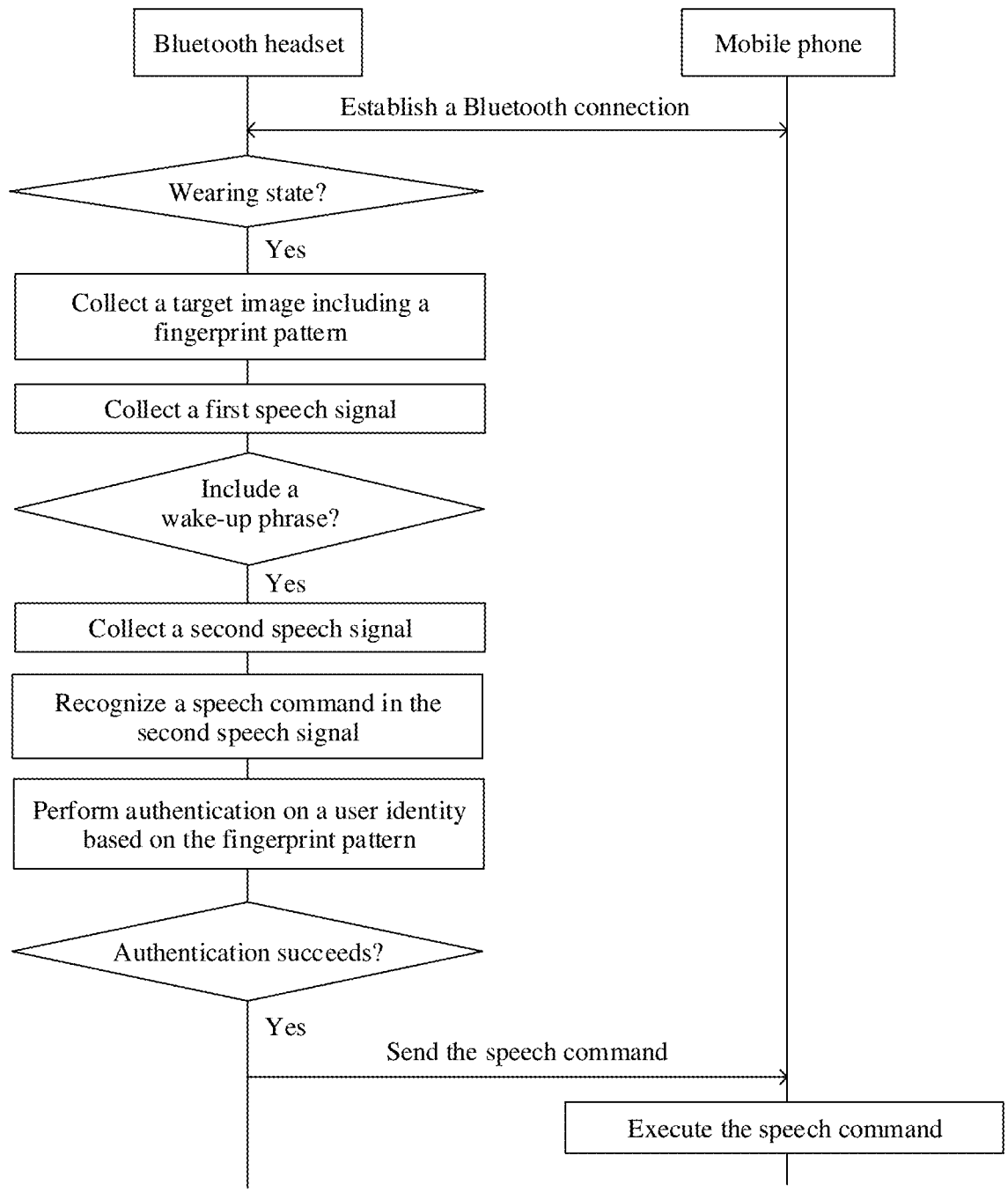
FIG. 17 is a schematic diagram of an interaction solution 8 between a mobile phone and a Bluetooth headset by using a fingerprint pattern and speech that are collected by the Bluetooth headset according to at least one embodiment of this application.

In the solution 8, as shown in FIG. 17, after the user wears the Bluetooth headset, the Bluetooth headset may collect, on the fingerprint sensor, the target image that includes the fingerprint pattern and that is input by the user. The Bluetooth headset may enable the speech sensor and collect the first speech signal input by the user. When it is detected that the first speech signal includes the preset wake-up phrase, the Bluetooth headset may continue to collect the second speech signal input by the user.

Similar to the solution 4, an authorized fingerprint of the Bluetooth headset and a speech recognition algorithm that is used to recognize the second speech signal may be pre-stored in the Bluetooth headset In this case, still as shown in FIG. 17, based on the target image collected by the Bluetooth headset, the Bluetooth headset may perform, based on the fingerprint pattern in the target image, authentication on a user identity of the user wearing the Bluetooth headset in this case. In addition, based on the second speech signal collected by the Bluetooth headset, the Bluetooth headset may perform speech recognition on the second speech signal by using the speech recognition algorithm, to recognize a speech command in the second speech signal.

For example, the Bluetooth headset may first recognize the speech command in the second speech signal by using the speech recognition algorithm. In this case, the Bluetooth headset may further determine whether authentication needs to be performed on the user identity when the mobile phone executes the speech command. If authentication needs to be performed on the user identity, the Bluetooth headset may perform authentication on the user identity based on the fingerprint pattern in the target image. If the authentication on the identity succeeds, the Bluetooth headset may send the recognized speech command to the mobile phone, and the mobile phone executes the speech command. If authentication does not need to be performed on the user identity when the speech command is executed, the Bluetooth headset does not need to perform authentication on the user identity, and may send the recognized speech command to the mobile phone, and the mobile phone executes the speech command.

Alternatively, similar to the solution 4, after recognizing the speech command in the second speech signal input by the user, the Bluetooth headset may send the collected second speech signal to the mobile phone instead of sending the speech command recognized by the Bluetooth headset to the mobile phone. In this case, the mobile phone may perform speech recognition on the second speech signal again by using the pre-stored speech recognition algorithm, to obtain the speech command in the second speech signal. Details are not described again in at least one embodiment of this application.

In this case, in the speech recognition methods provided in the foregoing solutions 5 to 8, the user may input the preset wake-up phrase to the Bluetooth headset to wake up the Bluetooth headset to cooperate with the mobile phone to complete a user identity authentication process and a speech recognition process. In the entire speech recognition process, the user may input the fingerprint and the speech signal on the worn Bluetooth headset, to reduce interaction complexity in the speech recognition scenario. In addition, in the speech recognition scenario in which authentication needs to be performed on the user identity, authentication may be performed on the user identity in a current use process based on a fingerprint entered each time the user uses the Bluetooth headset. This ensures security of the speech recognition process.

It may be understood that when the user removes the Bluetooth headset, the Bluetooth headset may clear fingerprint data in the headset.

It may be understood that, in the foregoing at least one embodiment, the mobile phone may be in a screen-off state, a screen-locked state, or a screen-locked and screen-off state. After the fingerprint input by the user is collected by using the Bluetooth headset, the mobile phone may be woken up after authentication succeeds, so that the mobile phone may be in a screen-on state, an unlocked state, or an unlocked and screen-on state. In some embodiments of this application, that the mobile phone executes a function corresponding to speech includes:

the Bluetooth headset recognizes a speech command in the speech, the Bluetooth headset sends the speech command to the mobile phone, and the mobile phone executes a function corresponding to the speech command; or the mobile phone may recognize a speech command in the speech, and the mobile phone executes a function corresponding to the speech command; or the Bluetooth headset sends the speech to the cloud server, the cloud server recognizes a speech command in the speech, the cloud server sends the speech command to the Bluetooth headset, the Bluetooth headset sends the speech command to the mobile phone, and the mobile phone executes a function corresponding to the speech command.

It may be understood that the cloud server may alternatively send the speech command to the mobile phone, and the mobile phone executes the function corresponding to the speech command.

In some embodiments of this application, that the mobile phone executes a function corresponding to speech may be at least one of the following functions:

the mobile phone executes a call making function corresponding to the speech; or the mobile phone executes an SMS message sending function corresponding to the speech; or the mobile phone executes an application starting function corresponding to the speech, for example, starting a WeChat application; or the mobile phone executes a photographing function corresponding to the speech, for example, starting a photographing application and performing photographing; or the mobile phone executes a payment function corresponding to the speech, for example, starting Alipay and completing payment.

In some embodiments of this application, the fingerprint pattern input by the user may be stored in the Bluetooth headset. When the Bluetooth headset is in a dormant state, the Bluetooth headset may collect the wake-up phrase input by the user, and wake up the Bluetooth headset. The Bluetooth headset may collect another speech input by the user, and send the another speech and the fingerprint pattern that is stored in the Bluetooth headset to the mobile phone. In this way, the mobile phone may compare the received fingerprint pattern sent by the Bluetooth headset with the pre-stored fingerprint, and may execute a function corresponding to the another speech after authentication succeeds. For example, Alipay is started to complete payment.

In some embodiments of this application, the Bluetooth headset may discard the collected fingerprint pattern input by the user. In this way, when collecting again the fingerprint pattern input by the user, the Bluetooth headset may be woken up. The Bluetooth headset may send, to the mobile phone, the collected fingerprint pattern input by the user, and the mobile phone performs authentication.

In some embodiments of this application, when a low-permission command (for example, answer a call, hang up a call, or start the camera) is recognized in speech input by the user and collected by a wearable device such as the Bluetooth headset, the wearable device may activate an electronic device by using a security link, and send, to the electronic device by using the security link, the fingerprint pattern and the speech that are collected by the Bluetooth headset, for example, to the mobile phone.

In some embodiments of this application, when a high-permission command (for example, enable WeChat payment or enable Alipay payment) is recognized in speech input by the user and collected by a wearable device such as the Bluetooth headset, the wearable device may activate an electronic device by using a security link, and send, to the electronic device by using the security link, the fingerprint pattern and the speech that are collected by the Bluetooth headset, for example, to the mobile phone.

In some embodiments of this application, when it is detected that the user wears the Bluetooth headset, and it is not detected that the user removes the Bluetooth headset, the fingerprint input by the user and collected by the Bluetooth headset may be stored in the Bluetooth headset. When it is detected that the user removes the Bluetooth headset, the Bluetooth headset may discard the stored fingerprint. In this way, security can be better ensured.

It may be understood that the Bluetooth headset is used as an example for description above, and another wearable device may also be used, for example, another wearable device such as smart glasses or a smart wristwatch. Certainly, the Bluetooth headset is also a wearable device. The mobile phone is used as an example for description above, and another electronic device such as a tablet computer or a notebook computer may also be used. Certainly, the mobile phone is also an electronic device.

In some embodiments of this application, at least one embodiment of this application discloses a wearable device. As shown in FIG. 3, the wearable device may include a fingerprint sensor 201, one or more processors, a memory, a communications module 205, one or more application programs (not shown), and one or more computer programs, and the foregoing components may be connected by using one or more communications buses. The one or more processors may be a computing module 207 in FIG. 3. The memory may be a storage module 208 in FIG. 3. The one or more computer programs are stored in the memory 1003 and configured to be executed by the one or more processors 1002. The one or more computer programs include an instruction, and the instruction may be used to perform steps in FIG. 6 and corresponding embodiments.

The wearable device may further include components such as a microphone, an acceleration sensor, and the fingerprint sensor 201, the optical proximity sensor 204, the loudspeaker 206, the telephone receiver 203, and the power supply 209 that are shown in FIG. 3. This is not limited in at least one embodiment of this application.

When the functions in the foregoing embodiments are implemented in the form of a software functional unit and sold or used as an independent product, the functions may be stored in a non-transitory computer-readable storage medium. Based on such an understanding, the technical solutions of some embodiments of this application, or a part according to other approaches, or all or some of the technical solutions may be implemented in the form of a software product. The software product is stored in a non-transitory computer-readable storage medium and includes several instructions for instructing a computer device (which may be a personal computer, a server, or a network device) to perform all or some of the steps of the methods described in some embodiments of this application. The foregoing non-transitory computer-readable storage medium includes: any medium that can store program code, such as a flash memory, a removable hard disk, a read-only memory, a random access memory, a magnetic disk, or an optical disc.

The foregoing is merely specific implementations of some embodiments of this application, but a protection scope of this application is not limited thereto. Any variation or replacement within the technical scope disclosed in this application shall be within the protection scope of this application. Therefore, the protection scope of this application shall be subject to the protection scope of the claims.

What is claimed is:

1. A speech recognition method, wherein the method comprises:
    collecting, by a wearable device, a fingerprint pattern input by a user and speech input by the user, wherein the wearable device is woken up in response to the fingerprint input by the user;
    sending, by the wearable device, the fingerprint pattern to an electronic device, to enable the electronic device to perform authentication on the fingerprint pattern input by the user; and
    sending, by the wearable device, the speech to the electronic device, to enable the electronic device to execute a function corresponding to the speech upon a determination that the authentication succeeds,
    the method further comprising:
    recognizing, by the wearable device, a speech command in the speech input by the user and collected by the wearable device; and
    determining, by the wearable device, whether the recognized speech command indicates that the authentication is needed in order to execute the speech command, wherein
    in response to the recognized speech command indicating that the authentication is needed in order to execute the speech command,
        the wearable device sends the fingerprint pattern to the electronic device, to enable the electronic device to perform the authentication on the fingerprint pattern input by the user, and
    in response to the recognized speech command indicating that the authentication is not needed in order to execute the speech command,
        the wearable device sends the recognized speech command to the electronic device to enable the electronic device to execute the speech command without having to perform the authentication.

2. The method according to claim 1, wherein the method further comprises:
    waking-up the wearable device in response to the fingerprint pattern input by the user.

3. The method according to claim 1, wherein the method further comprises:
    storing, by the wearable device, the fingerprint pattern input by the user; and
    deleting, by the wearable device, the stored fingerprint pattern in response to
        determining, by the wearable device, that the user removes the wearable device which is no longer in a wearing state, or
        a determination that the authentication fails.

4. The method according to claim 3, wherein the method further comprises:
    waking-up the wearable device in response to detecting, by the wearable device, a wake-up phrase input by the user,
    wherein, upon being woken up, the wearable device performs the collecting the speech input by the user, and the sending the speech and the fingerprint pattern stored in the wearable device to the electronic device.

5. The method according to claim 1, wherein
    the wearable device does not perform the authentication on the fingerprint pattern input by the user and collected by the wearable device.

6. The method according to claim 1, wherein
    in said determining, by the wearable device, whether the recognized speech command indicates that the authentication is needed in order to execute the speech command,
        the wearable device determines that the authentication is needed, in response to
            the speech command includes a preset keyword, or
            an application that executes the speech command is in an application list pre-stored in the wearable device, and
        the wearable device determines that the authentication is not needed, in response to
            the speech command does not include the preset keyword, or
            the application that executes the speech command is not in the application list pre-stored in the wearable device.

7. A wearable device, comprising:
    a fingerprint sensor;
    a speech sensor;
    at least one further sensor other than the fingerprint sensor and the speech sensor;
    a communications module; and
    a processor, wherein
    the processor is configured to:
        detect, using the at least one further sensor, whether the wearable device is in a wearing state in which the wearable device is worn, and
        in response to the processor detecting that the wearable device is in the wearing state,
            enable the fingerprint sensor to collect a fingerprint pattern input by a user,
            enable the speech sensor to collect speech input by the user, and
            cause the communications module to send, over a wireless connection between the wearable device and an electronic device, information corresponding to at least one of the fingerprint pattern collected by the fingerprint sensor or the speech collected by the speech sensor to the electronic device, to enable the electronic device to execute a function corresponding to the speech upon a determination that authentication performed on the fingerprint pattern succeeds,
    the processor is configured to:
        in response to the processor detecting that the wearable device is in the wearing state,
            enable the speech sensor to collect, at a first working frequency, a first speech signal input by the user,
        identify whether the collected first speech signal includes a preset wake-up phrase,
        in response to the processor identifying that the collected first speech signal includes a preset wake-up phrase,
            enable the speech sensor to collect, at a second working frequency higher than the first working frequency, a second speech signal input by the user,
    the wearable device further comprises a non-transitory computer-readable storage medium configured to store the fingerprint pattern input by the user and collected by the fingerprint sensor, and the processor is configured to,
in response to a determination that the user removes the wearable device which is no longer in the wearing state,
delete the fingerprint pattern input by the user and collected by the fingerprint sensor from the non-transitory computer-readable storage medium.

8. The wearable device according to claim 7, wherein the processor is configured to,
in response to the processor detecting that the wearable device is in the wearing state,
cause a notification to be issued, through vibration, speech, or light, to prompt the user to input a fingerprint on the fingerprint sensor.

9. The wearable device according to claim 7, wherein the wearable device is a headset, and
the at least one further sensor comprises at least one of an acceleration sensor or an optical proximity sensor.

10. The wearable device according to claim 7, wherein the processor is configured to:
recognize a speech command in the second speech signal, and
cause the communications module to send, over the wireless connection to the electronic device, the fingerprint pattern collected by the fingerprint sensor and the speech command recognized from the second speech signal.

11. The wearable device according to claim 7, wherein the processor is configured to:
in response to the speech sensor collecting the second speech signal input by the user,
perform the authentication on the fingerprint pattern input by the user and collected by the fingerprint sensor, and
in response to the determination that the authentication performed on the fingerprint pattern succeeds,
cause the communications module to send, over the wireless connection to the electronic device, the second speech signal input by the user and collected by the speech sensor.

12. A wearable device, comprising:
a fingerprint sensor;
a speech sensor;
at least one further sensor other than the fingerprint sensor and the speech sensor;
a communications module; and
a processor, wherein
the processor is configured to:
detect, using the at least one further sensor, whether the wearable device is in a wearing state in which the wearable device is worn, and
in response to the processor detecting that the wearable device is in the wearing state,
enable the fingerprint sensor to collect a fingerprint pattern input by a user,
enable the speech sensor to collect speech input by the user, and
cause the communications module to send, over a wireless connection between the wearable device and an electronic device, information corresponding to at least one of the fingerprint pattern collected by the fingerprint sensor or the speech collected by the speech sensor to the electronic device, to enable the electronic device to execute a function corresponding to the speech upon a determination that authentication performed on the fingerprint pattern succeeds,
the processor is configured to:
in response to the processor detecting that the wearable device is in the wearing state,
enable the speech sensor to collect, at a first working frequency, a first speech signal input by the user,
identify whether the collected first speech signal includes a preset wake-up phrase,
in response to the processor identifying that the collected first speech signal includes a preset wake-up phrase,
enable the speech sensor to collect, at a second working frequency higher than the first working frequency, a second speech signal input by the user, and
the processor is configured to:
in response to the speech sensor collecting the second speech signal input by the user,
cause the communications module to send, over the wireless connection to the electronic device, the second speech signal input by the user and collected by the speech sensor,
in response to the communications module receiving a request to perform the authentication from the electronic device, which has determined based on the second speech signal that the authentication is needed,
perform the authentication on the fingerprint pattern input by the user and collected by the fingerprint sensor, and
cause the communications module to send, over the wireless connection to the electronic device, a response message indicating to the electronic device whether the authentication succeeds or fails.

* * * * *